United States Patent
Ichihara et al.

(10) Patent No.: US 7,254,106 B2
(45) Date of Patent: Aug. 7, 2007

(54) METHOD AND EQUIPMENT FOR STORING HOLOGRAPHIC DATA

(75) Inventors: Katsutaro Ichihara, deceased, late of Kanagawa-ken (JP); by Urara Ichihara, legal representative, Kanagawa-ken (JP); Kazuki Matsumoto, Kanagawa-ken (JP); Akiko Hirao, Chiba-ken (JP); Rumiko Hayase, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 511 days.

(21) Appl. No.: 10/930,770

(22) Filed: Sep. 1, 2004

(65) Prior Publication Data

US 2005/0088947 A1  Apr. 28, 2005

(30) Foreign Application Priority Data

Sep. 30, 2003  (JP)  ............................. 2003-339818

(51) Int. Cl.
 *G11B 7/00*  (2006.01)
(52) U.S. Cl. ........................... 369/103; 359/11
(58) Field of Classification Search ................ 369/103; 359/11
 See application file for complete search history.

(56) References Cited

U.S. PATENT DOCUMENTS

| 6,697,180 B1* | 2/2004 | Wilson et al. ................ 359/11 |
| 7,130,092 B1* | 10/2006 | Horimai ....................... 359/35 |
| 2003/0090969 A1* | 5/2003 | Matsumoto et al. ...... 369/44.34 |
| 2005/0002311 A1* | 1/2005 | Ichihara et al. ............. 369/103 |

FOREIGN PATENT DOCUMENTS

| JP | 11-345419 | 12/1999 |
| JP | 2002-183975 | 6/2002 |

\* cited by examiner

*Primary Examiner*—Thang V Tran
(74) *Attorney, Agent, or Firm*—Oblon, Spivak, McClelland, Maier & Neustadt, P.C.

(57) ABSTRACT

A method for storing holographic data in a medium having a reflection layer and a recording layer comprises: recording, rotating and repeating. An interference pattern is recorded at a recording position of the recording layer of the medium in a stationary state. The interference pattern is formed by an interference between an object beam and a reference beam which are irradiated into the recording layer from an opposite side of the reflection layer. The medium is rotated so as to shift the recording position by a distance of n×Sh where n is a positive integer and Sh is a predetermined recording shift amount. The recording and the rotating are repeated alternately.

20 Claims, 23 Drawing Sheets

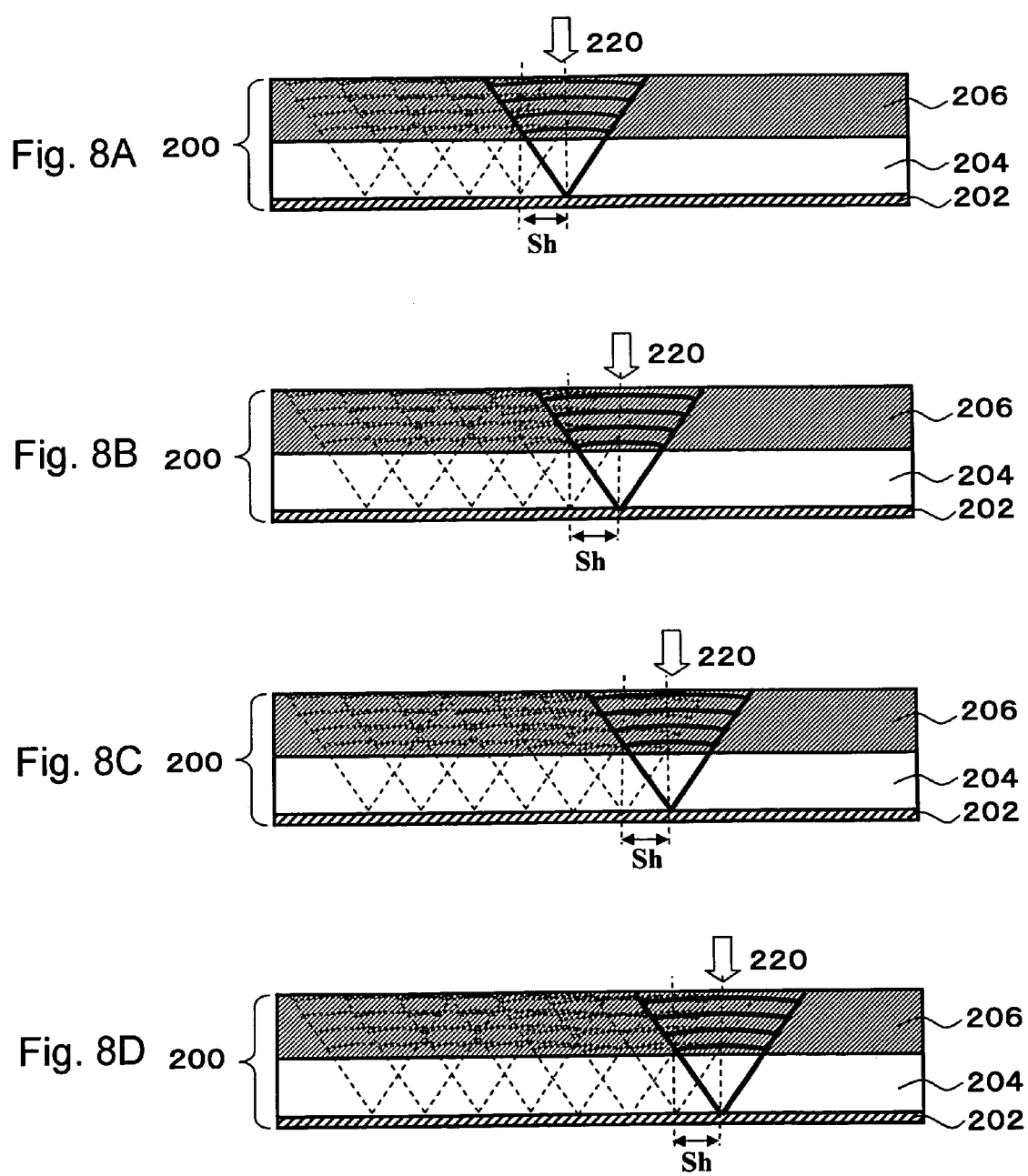

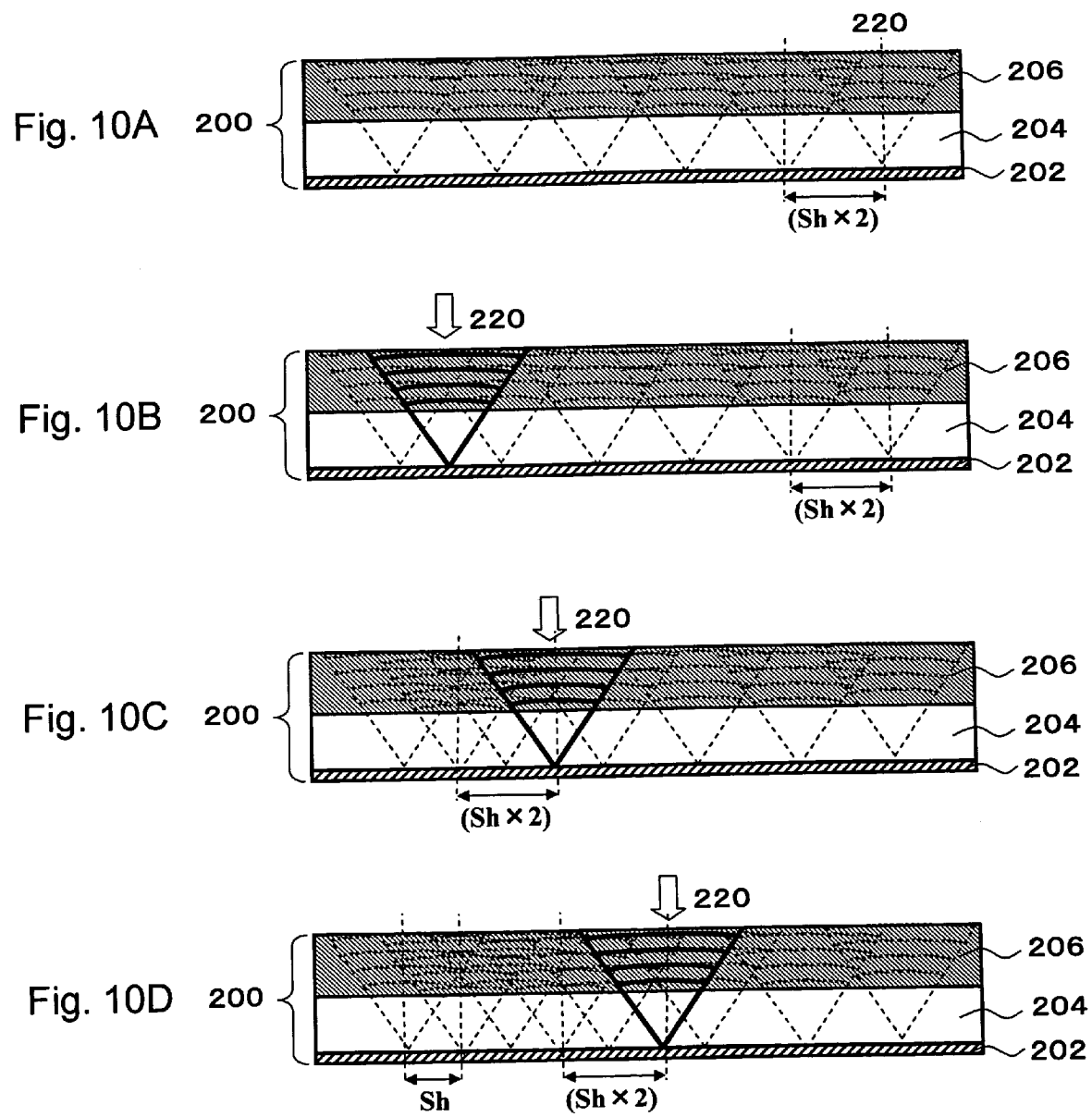

METHOD AND EQUIPMENT FOR STORING HOLOGRAPHIC DATA

CROSS-REFERENCE TO RELATED APPLICATION

This application is based upon and claimed the benefits of priority from the prior Japanese Patent Application No.2003-339818, filed on Sep. 30, 2003, the entire contents of which are incorporated herein reference.

BACKGROUND OF THE INVENTION

This invention relates to a method and an equipment for storing holographic data, especially to a method for recording a large capacity of information with a high speed and an equipment suitable for recording a large capacity of information with a high speed.

Since an optical recording equipment and a medium have advantages such as a medium compatibility or a storage stability in comparison with the HDD (Hard Disc Drive) and faster access in comparison with a tape storage system, they have been widely used or are planned to be introduced to the equipments such as a computer back-up memory, a video recording/playback player for home-use, a navigation system for vehicle, a recorder for a video-camera, a Personal Digital Assistant, and a professional video recorder for medical, broadcasting and movie application.

In order to familiarize the optical memory equipment and expand its application, upgrading of the memory capacity and the data transfer speed is required further. The reason why the optical disc memory is used widely is that fast access capability and excellent usability are preferred.

The widely used optical disc includes a CD-ROM for a read only memory, a DVD-ROM, a WORM for write once memory, a CD-R, a DVD-R, a CD-RW for rewritable, a DVD-RAM, a DVD±RW and a MO. The above-mentioned optical disc systems use a principal that an optical beam narrowed to a diffraction limit by an objective lens is focused on the medium so as to record or read out the data. Based on this principle, there are few ways to increase the memory capacity. One is to use the shorter wavelength light. The other is to use an objective lens having a large NA (numerical aperture). Other ideas such as a mark-edge recording, a Land and Groove recording, a modulation/demodulation technique like PRML (Partial Response Maximum Likelihood), a multi-layered recording medium having a plurality of recording layers and a super resolution reading technique are proposed. However, since these methods adapt the optical system in which the recording medium surface is located in a focal point, the wavelength and the NA of the objective lens limit the memory capacity.

On the other hand, "holographic data storage" has been proposed which uses the different principal from the current optical disc recording. In this case, the focused beam narrowed to the diffraction limit is not irradiated into the recording layer. The recording layer is approximately 10,000 times thicker (for example, several hundreds microns) compared to that of the current optical disc, and recording or reading is carried out in a block of a frame or a page toward the medium thickness direction.

SUMMARY OF THE INVENTION

According to an aspect of the invention, there is provided a method for storing holographic data in a medium having a reflection layer and a recording layer, comprising:

recording an interference pattern at a recording position of the recording layer of the medium in a stationary state, the interference pattern being formed by an interference between an object beam and a reference beam which are irradiated into the recording layer from an opposite side of the reflection layer;

rotating the medium so as to shift the recording position by a distance of n×Sh where n is a positive integer and Sh is a predetermined recording shift amount; and repeating the recording and the rotating alternately.

According to another aspect of the invention, there is provided an equipment for storing holographic data comprising:

a recording light irradiating unit which records an interference pattern at a recording position of a recording layer of a recording medium having a reflection layer and the recording layer by irradiating an object beam and a reference beam into the recording medium from an opposite side of the reflection layer, an intermittent driving unit which rotates the recording medium intermittently so as to shift the recording position by a distance of n×Sh where n is a positive integer and Sh is a predetermined recording shift mount; and a control unit which controls the recording light irradiating unit and the intermittent driving unit so that the recording by the recording light irradiating unit and the rotation by the intermittent driving unit are executed alternately.

In the specification, a "recording shift amount" is defined as a recording pitch (or a spatial separation). In other words, when the recording is carried out sequentially by rotating the medium small angle intermittently, the interference patterns are arranged with a predetermined pitch (or a separation) in the medium finally. A "recording shift amount" can be expresses as a pitch of the interference pattern arrangement.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings:

FIGS. 8A through 8D are schematic diagrams showing recording procedures in the case of n=1;

FIGS. 10A through 10D are schematic diagrams showing recording procedures in which a new pattern is recorded between the patterns already recorded in the case of n=2;

DETAILED DESCRIPTION

Figure 1:
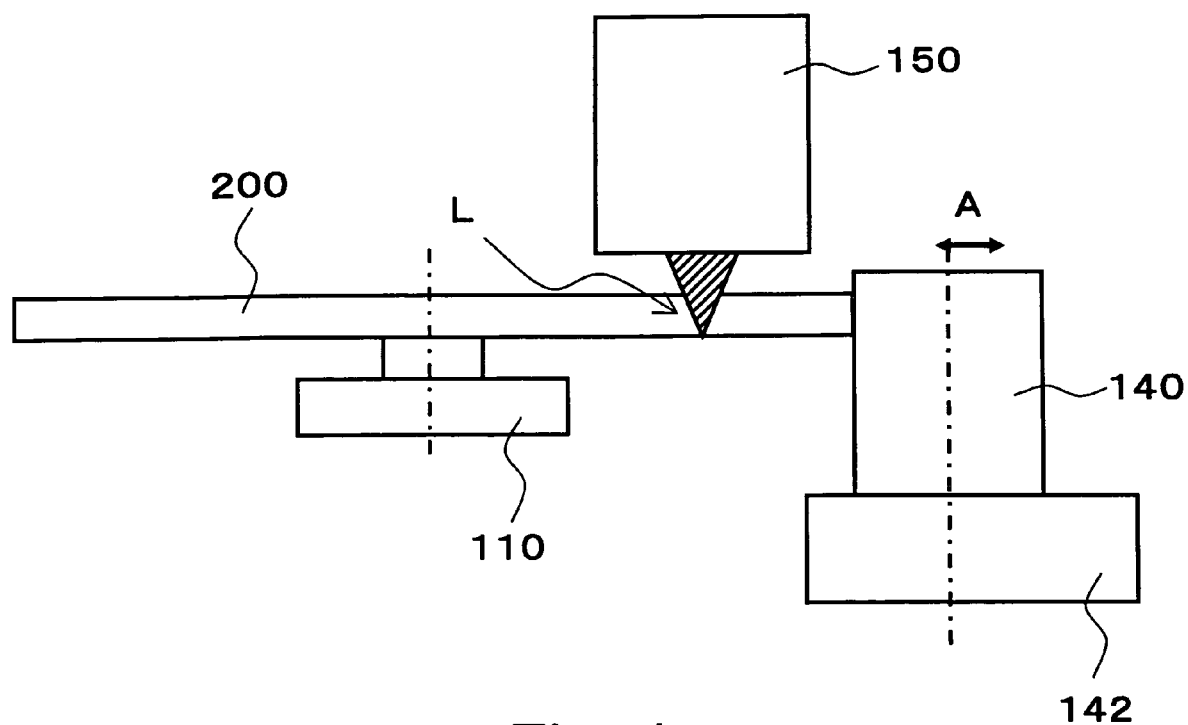
FIG. 1 is a schematic diagram of a holographic data storage equipment according to an embodiment of the invention.

In the case of the holographic data storage, the focused beam narrowed to the diffraction limit is not irradiated into the recording later. The recording layer is approximately 10,000 times thick (for example, several hundreds microns) compared to the current optical disc, and recording or reading is carried in block for a frame or a page toward the medium thickness direction.

A recording pattern is formed by a spatial light modulator such as a LCD and a digital mirror array. A recording principal is such that a spatially modulated object beam and a reference beam are irradiated into a medium simultaneously, and then the optical change occurs in the light enhanced position by the interference between both beams. This optical change is recorded as an interference pattern corresponding to an information signal to be recorded three-dimensionally in the medium. Also, the different interference pattern can be recorded by an angle multiplexing or a shift multiplexing in the same or the superimposed position in the holographic recording layer.

On the other hand, information reading can be carried out for each frame or page in block when the reference beam is irradiated onto the recorded interference pattern in the medium and then the diffracted light is obtained according to the pattern. In the case of an angle multiplexing recording, different multiplexed interference patterns can be read out by irradiating the reference beam into the same position of the medium at various angles. Also, in the case of shift multiplication recording, the superimposed multiplexed interference patterns can be read by irradiating the reference beam at the position apart from 1-100 μm approximately.

Thus, since the holographic data of a frame or a page can be recorded or read in one big data block at one beam shot and the different information can be recorded or read in the same location or in the superimposed location, it can be expected to achieve large memory capacity and high transfer speed compared to current bit by bit recording method which only a bit data is recorded or read at one beam shot.

Although many holographic recording methods are proposed, almost all of them use a "transmission-type angle multiplexing method". In this method, when the object and the reference beam are irradiated at the predetermined relative angle simultaneously, the interference pattern can be formed in several hundreds microns thick holographic recording layer. Then, the different interference patterns are formed by changing the relative angle between the object and the reference beam. Reading is carried out when the reference beam is irradiated by changing a position where the recording is carried out, and the reading can be carried out using a transmission diffractive light. Advantage of this method is to obtain the extremely large memory capacity. However, disadvantage is little tolerance for an angle variation and the alignment accuracy between an incident and a transmission reading optical configuration. Therefore, the compact and low cost equipment becomes difficult.

Recently, a "reflection-type shift multiplexing method" is proposed in order to solve the above-mentioned disadvantage. In this method, a reflection layer is formed on a surface of a transparent substrate and a holographic recording layer is formed on an opposite surface of the substrate. The recording and the reading beam are irradiated into the holographic recording layer along a common optical axis. A focal point is located in the reflection layer of the medium. The reflected object or the reference beam is interfered with the incident reference or the object beam respectively and an interference pattern is recorded.

Also, the method in which the object beam and the reference beam are linearly polarized lights perpendicular to each other and the objective lens is provided in the vicinity of the incident surface of the medium is proposed (Japanese Patent Laid-Open publication No.2002-183975). In this case, a first gyrator through which a polarized plane rotates +45° and a second gyrator through which a polarized plane rotates −45° are provided on the incident side of the objective lens. Before the object and the reference beam are irradiated into the two-divided gyrator, each polarized plane is orthogonal. The object beam rotates +45° (or −45°) through the gyrator, and the reference beam rotates −45° (or +45°) through the gyrator. Since the polarized planes of the object and the reference beam coincide under such optical configuration, the interference pattern corresponding to input information is formed by the interference between the object and the reference beam when these two lights are irradiated through the objective lens. In the case of reading, only the reference beam is irradiated and the interference pattern can be read by the reflection-type method in the same manner as the recording.

The reflection-type multiplexing method is the shift multiplexing method such that in the case of one recording area having several hundreds microns (depending on the substrate thickness and the recording layer thickness) the different interference patterns are recorded and read by repeating the shifts ranging from several to ten microns approximately. In this method, many independent interference patterns can be formed in the same position physically and read as well as in the angle multiplexing method. Also, since only an optical configuration is needed so as to have a common constitution in an incident and a detecting optical configuration, this method has an advantage such that an optical alignment is not necessary. Furthermore, since recording and reading are carried out using concentric wave-front having a center of the focal point, there are provided advantages such that tolerance for a disc tilt is high and a compatibility to DVDs and CDs can be expected.

However, the conventional technology mentioned above has a basic conception that a recording is carried out in a stationary state between the medium and the recording light relatively. As a result, there is a basic problem that optical, mechanical and signal processing systems become complicated. These problems will be explained in detail, hereinafter.

In the case of the conventional transmission-type angle multiplexing method, the interference pattern is recorded in the medium by irradiation of the object and the reference beam with a predetermined optical power density and an irradiation time after a medium is left stationary, and the object and reference beam are set at a predetermined angle. After a recording at a certain angle, next recording is carried out in the same position of the stationary medium by changing the angle between the object and the reference beam (a few degrees×1/10), and a few frames are recorded by changing angles ranging from ±20-30° repeatedly, for example. In order to change the angle (a few degrees×1/10), a rotating mirror of a galvano-mirror is connected to a stepping motor and rotated slightly using a stepping motor or a gear within an angle accuracy of stepping motor. After the angle multiplexing recording in the same position, the medium is moved toward the beam slightly, typically several mm, and the angle multiplexing recording is carried out again.

On the other hand, in the case of the conventional reflection-type collinear holographic recording method, the medium and the recording light can be left relatively stationary by rotating the object and the reference beam synchronously with the disc rotation during certain times when the object and the reference beam are irradiated to a rotating disc, as disclosed in the Japanese Patent Laid-Open publication No.2002-183975.

The reason why the medium and the recording light should be left stationary in the conventional transmission and reflection holographic recording is explained below.

Certain times are needed for the interference pattern formation. If the medium moves relatively to the recording light during this period, the interference pattern is distorted. The detailed reason is explained numerically and more specifically.

The sensitivity which is defined as the recording energy for a saturated diffraction light is 10 mJ/cm² approximately even for a high sensitivity medium. When the optical disc is recorded using a beam having typical optical power of tens of mW (milliwatts) and several hundreds microns diameter, a power density becomes $10^5$ mW/cm² and hence recording times are required within the range of 0.1-1.0 ms. If the medium moving speed is several m/s approximately as well as in current optical disc, the medium would shift by a distance of 0.1-1 mm during the recording due to the relative speed difference. Therefore, the fine interference pattern can not be recorded on the moving medium with a speed of several m/s.

Based on these considerations, the inventors have invented the new method and equipment for a recording in a stationary state.

Referring to drawings, some embodiments of the present invention will now be described in detail.

FIG. 1 is a schematic diagram showing a holographic data storage equipment according to an embodiment of the invention.

A holographic recording medium 200 can be rotated by a spindle motor 110. A recording light L (or reading light) is irradiated into a medium 200 appropriately from an optics system and holographic data storage is carried out. The disc medium can be rotated intermittently and slightly by a function of a fine actuator 140. Since the medium 200 can be rotated by a small angle by the fine actuator 140, the holographic data storage can be carried out by the recording light L in the relatively stationary state. Subsequently, after the medium 200 is rotated intermittently and slightly, the holographic recording can be carried out again in the relatively stationary state. Thus, the holograph recording in the relatively stationary state of the medium and the intermittent rotation to an adjacent recording position are repeated alternately.

The fine actuator 140 can be moved appropriately toward a direction shown by an arrow A by a function of a coarse actuator 142. While recording, the medium 200 and the fine actuator are combined mechanically. On the other hand, when the medium is put on and taken off, the hologram is read and the other medium such as DVDs or CDs is driven, the fine actuator can be moved so that the medium 200 and the fine actuator 140 are disconnected.

Figure 2:
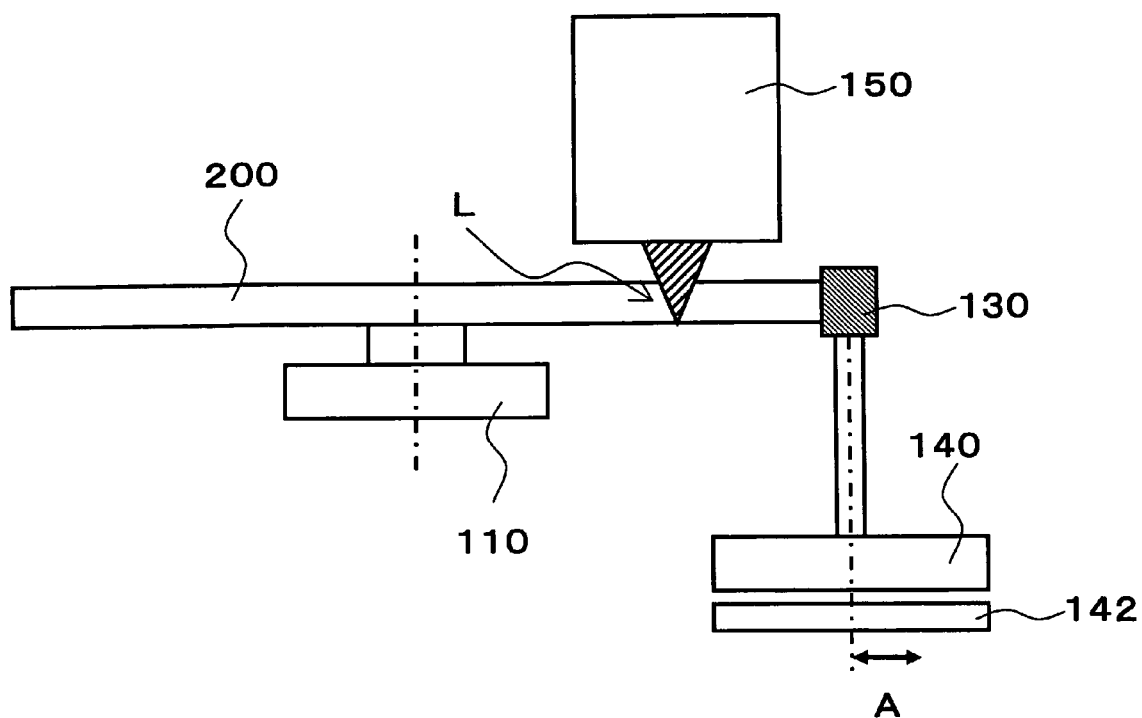
FIG. 2 is a schematic diagram of a first example of a holographic data storage equipment according to the embodiment.
Figure 3:
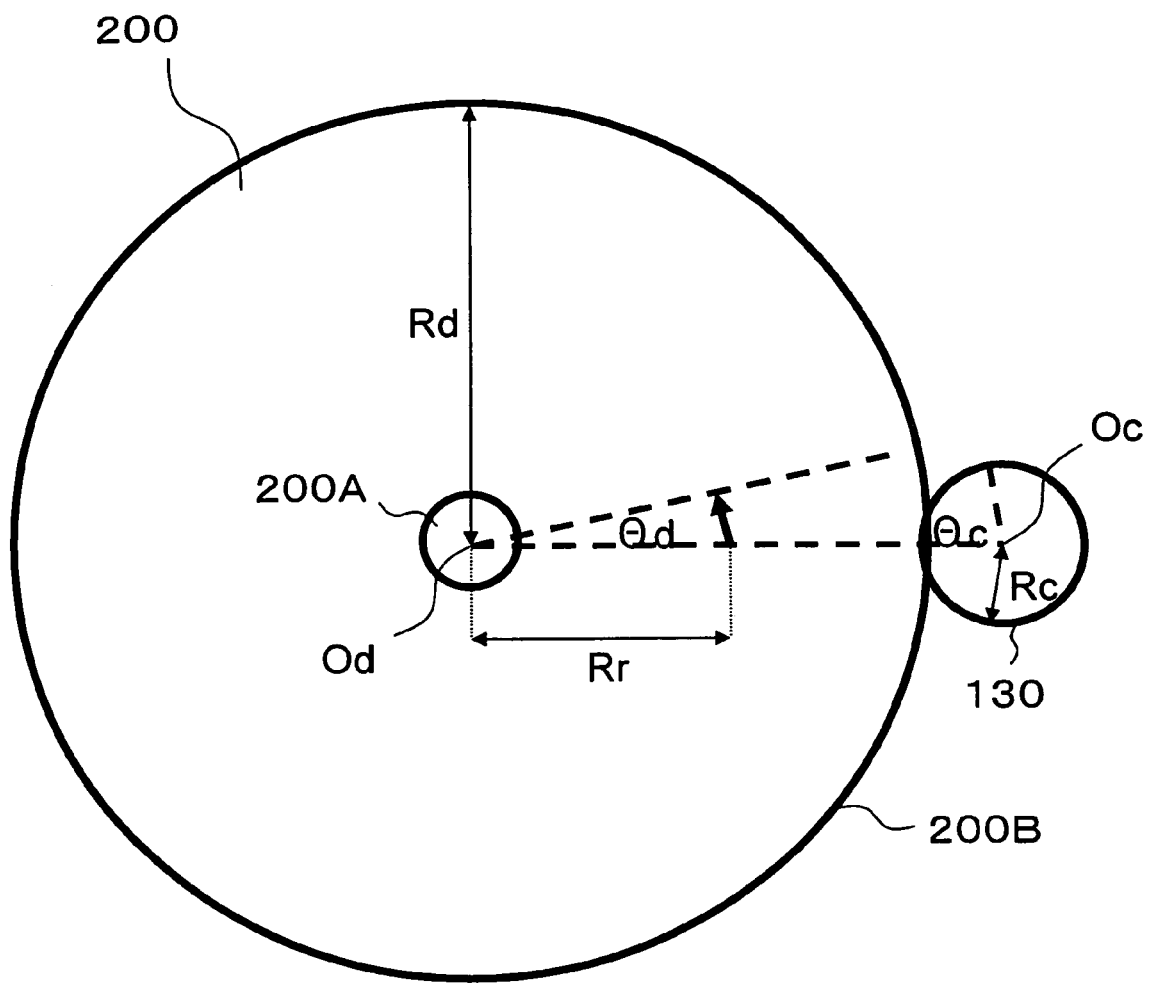
FIG. 3 is a top view of the equipment in FIG. 2 on the medium.

FIG. 2 is a schematic diagram showing a first example of the hologram recording equipment according to the embodiment. Also, FIG. 3 is a schematic diagram showing a top view of the media.

In this example, the fine actuator is a stepping motor 140 with a rotating member 130. The rotating member 130 is connected with a rotation axis of the stepping motor 140. Since the rotating member 130 is tangent to a circumference of the medium 200, the medium can be rotated slightly at angle. The rotation of the rotating member 130 is carried out during recording. According to this embodiment, since the medium 200 can be rotated small angle by the rotating member 130, the holographic recording can be carried out by the recording light L in the relatively stationary state. Subsequently, after the medium 200 is rotated small angle, the holographic recording can be carried out again in the relatively stationary state. Thus, the holographic recording in the relatively stationary state of the medium and the intermittent and slight rotation to an adjacent recording position are repeated alternately.

In terms of the contact of the rotating member 130 and the medium 200, for example, the medium 200 can be rotated due to friction between the rotating member 130 and the medium 200 by using friction-rich material such as rubber for the rotating member. Otherwise, gears may be provided in the circumference of the medium 200 and the rotating member 130 respectively so as to transmit the rotation operation. However, considering that the medium is light-weight, it is preferable to simply use a friction with a rubber-like material.

The stepping motor 140 is disposed on a motor moving base 142 and can be moved appropriately toward the directions shown by the arrow A. While recording, the stepping motor is located so that the medium 200 and the rotating member come into contact with each other mechanically. On the other hand, when the medium is put on and taken out, when the holographic data are read or when other medium such as DVDs or CDs is mounted and driven, the stepping motor 140 can be moved so that the medium 200 and the rotating member 130 are disconnected.

In order to improve the reading or transfer speed and ensure the compatibility with DVDs and CDs, the medium is rotated continuously on the spindle motor with a high speed in the case of holographic reading, DVDS and CDs. However, the medium can be rotated by the stepping motor 140 in reading of the hologram as well as in recording of the hologram. When the medium is rotated by the spindle motor, it is desirable that the stepping motor is in free run, or the rotating member is disconnected from the medium.

If the medium is fixed in the system, it is unnecessary to put on or take off the hologram medium on the spindle motor. However, it is desirable that the medium is changeable. When the medium is disposed on the spindle motor, it is desirable that the spindle motor is free, or the bearing is provided between the both rotation axes so that the medium can be driven by the stepping motor.

Figure 4:
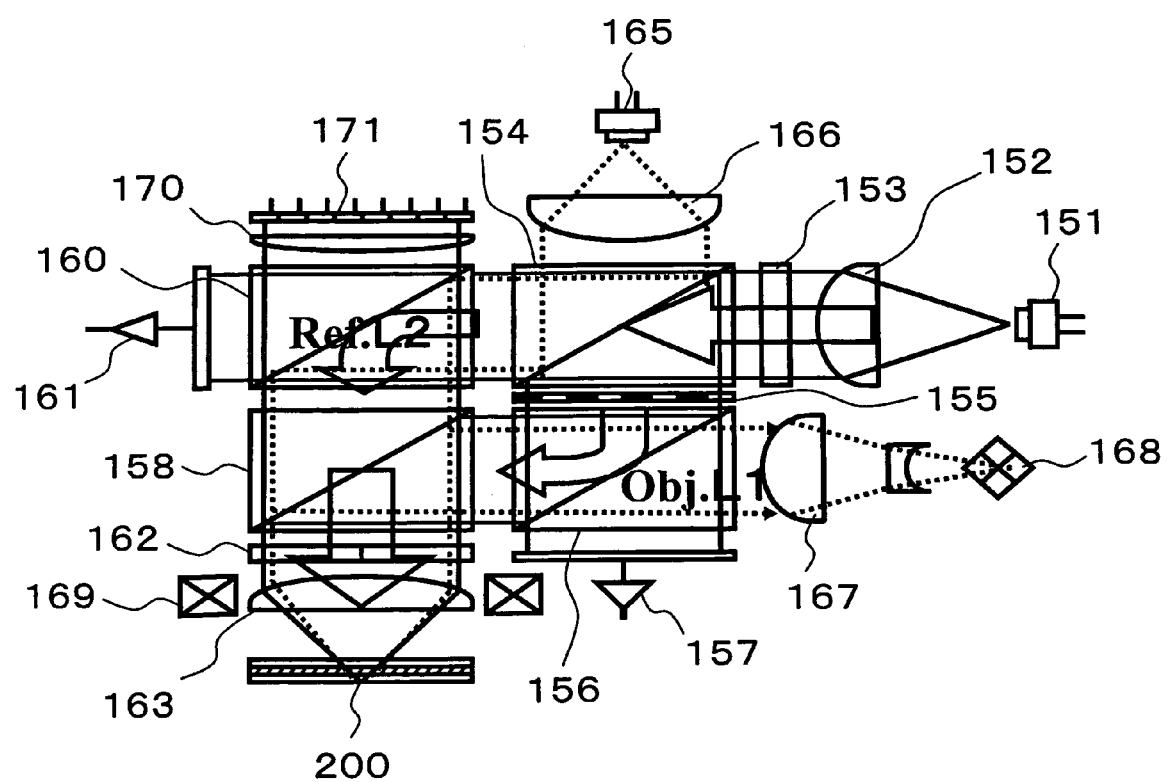
FIG. 4 is a schematic diagram showing a basic configuration of an optics system.

FIG. 4 is a schematic diagram showing a basic optics system 150. A beam irradiated from a reading/recording light source 151 is collimated through a lens 152, transmitted to a polarized beam splitter PBS 154 via a half wavelength plate 153, and divided into an object beam L1 of S-polarized light and a reference beam L2 of P-polarized beam L2. The object beam L1 is folded by the PBS 154 (downward in FIG. 4) and modulated spatially by a spatial light modulator SLM 155. Subsequently, via a half mirror HM 156, a part of the beam impinges upon a photo-detector 157 and the other part of the beam is folded toward a PBS 158. On the other hand, via a half mirror HM 160, a part of the reference beam L2 impinges upon a photo detector 161 and the other part of the beam is folded toward the PBS 158.

If a half wavelength plate 153 is rotated appropriately using the detecting signals of the PD 157 for the object beam and the PD 161 for the reference beam, an intensity balance between the object beam L1 and the reference beam L2 toward the PBS 158 can be adjusted. The object beam L1 is folded by the PBS 158 and propagates downward in FIG. 4. The reference beam L2 propagates downward in FIG. 4. When both beams pass through a 2-divided wavelength plate 162 (or gyrator), both polarized planes coincide. The object and the reference beam whose polarized planes coincide propagate through an objective lens 163 and impinge upon the medium 200. Thus, the recoding/reading becomes possible.

In addition, a servo information is obtained when a servo light is emitted from a servo light source 165, transmitted through optical elements, reflected at the medium surface, collected by a lens 167 and received by a photo detector 168. A wavelength of the servo light may be longer than that of the recoding/reading light wavelength because the medium is not sensitive at this longer wavelength. In FIG. 4, the recording/reading light path is represented by a solid line and the servo light path is represented by a broken line. The servo light passes through the PBS, the half mirror 160, the PBS 158, the gyrator 162, the objective lens 163, the servo plane on the medium, the objective lens 163, the gyrator 162, the PBS 158, the half mirror 156 and the lens 167, and impinges upon a four-part divided photo detector 168. Thus, servo signals, such as focusing, tracking and header regeneration, are detected. Then the objective lens 163 can be aligned by driving a voice coil motor VCM 169 according to the detected servo signal.

The recording/reading principal of the storage equipment according to this embodiment will be now explained hereafter.

When the object beam L1 and the reference beam L2 are irradiated simultaneously on the medium 200 in the optics system shown in FIG. 4, the spatial refractive index distribution occurs in the holographic recording layer according to an interference pattern between the spatially modulated object beam L1 and the reference beam L2, and hence the recording can be carried out. As the spatial light modulator 155, the LCD shutter or digital mirror array device can be used. For example, a page of an image data is divided into a few frames and each frame drives the SLM as a monochrome spatial pattern. The number of the SLM pixels depends upon an optical beam diameter passing through the SLM and is within the range of $10^5$-$10^6$ approximately. As a result, the patterns ranging from 0.1 to 1 Mbit can be recorded in block.

As described above, since it is necessary 0.1-1 ms to record a frame, the data transfer speed ranging from 100 Mbps to 10 Gbps can be achieved. However, the transfer speed is low a little bit, because a pixel does not correspond to 1 bit now but a few pixels correspond to 1 bit.

In the case of read-out, only the reference beam is irradiated on the medium. The reference beam L2 is diffracted by the interference pattern recorded in the medium as the refractive index distribution, and the diffracted light can be detected by the CCD detector 171, after passing through the objective lens 163, the gyrator 162, the PBS 158, the HM 160 and an imaging lens 170.

The principal of the reflection-type shift multiplexing recording method will be explained below.

Figure 5:
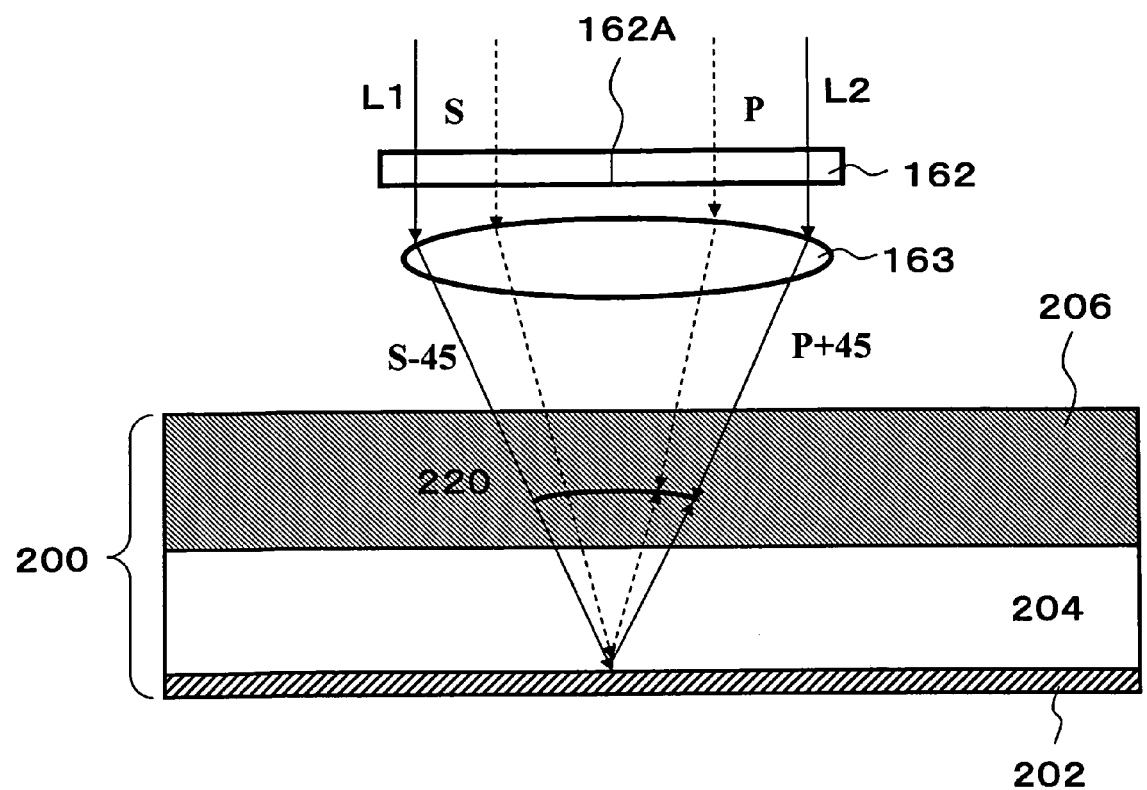
FIG. 5 is a graphic representation explaining a recording principal of an interference pattern.
Figure 6:
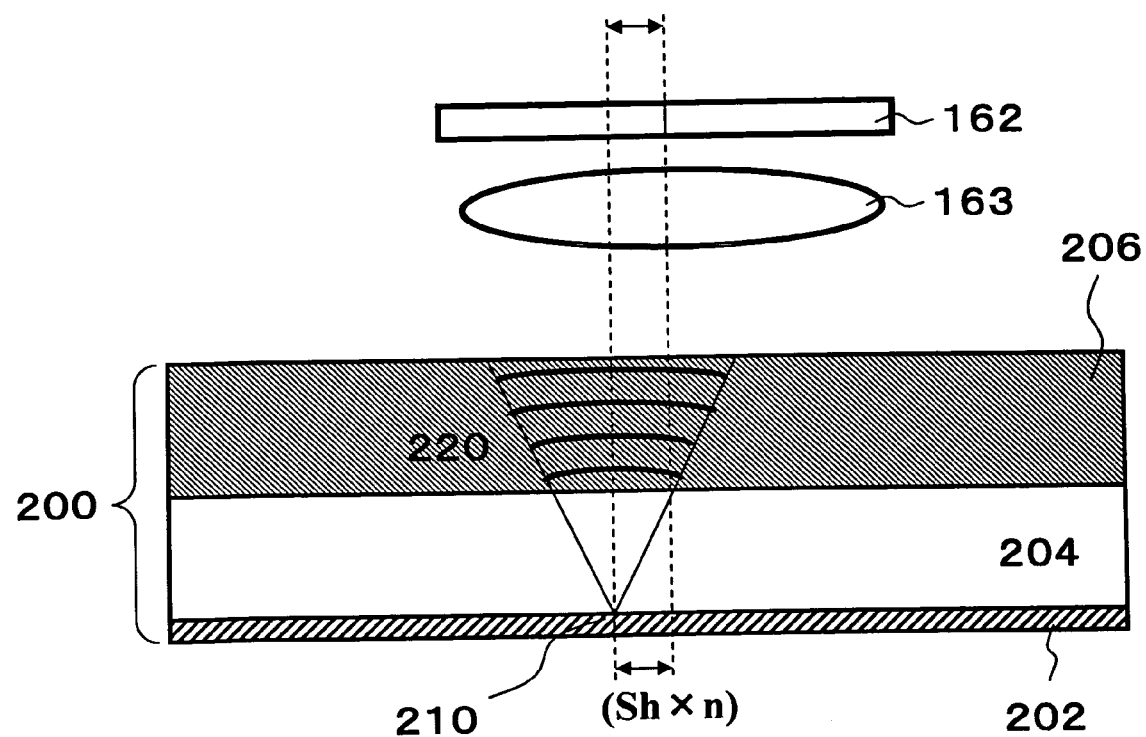
FIG. 6 is a graphical representation showing a state that a medium is rotated small angle by the rotating member in the equipment according to the embodiment.
Figure 7:
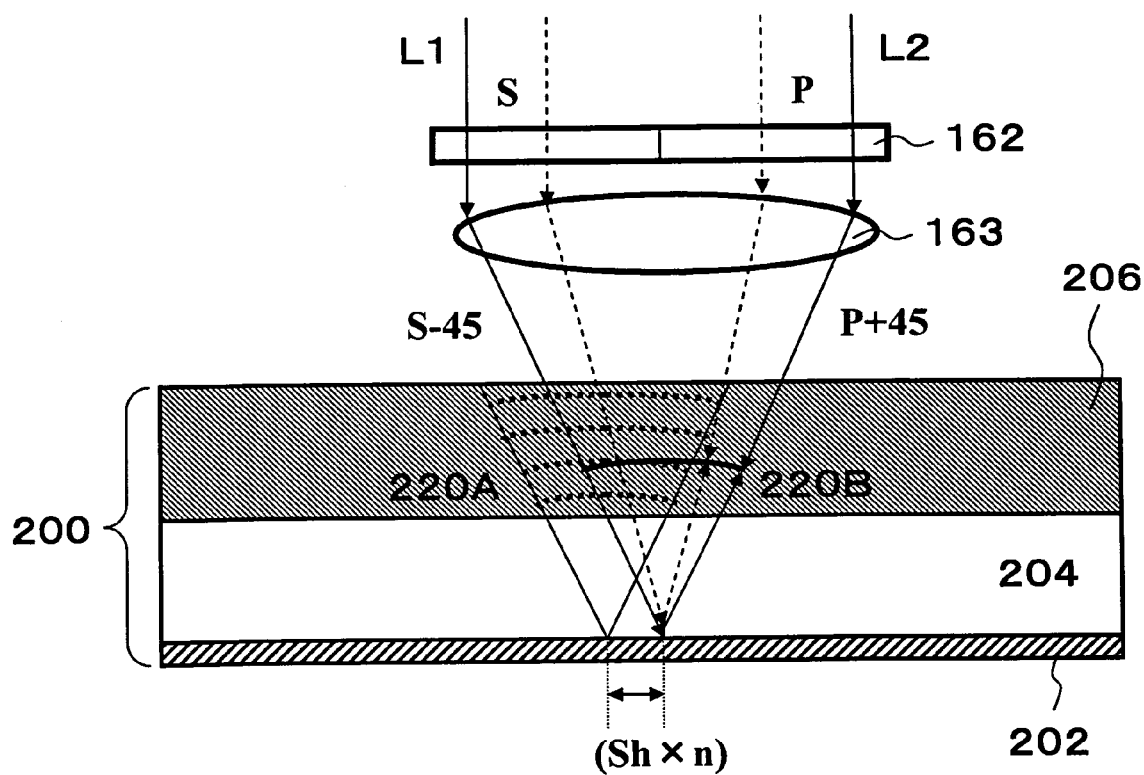
FIG. 7 is a graphical representation showing a state that the next frame is recorded in the medium after the recording shift amount Sh movement of the medium.
Figure 9A:
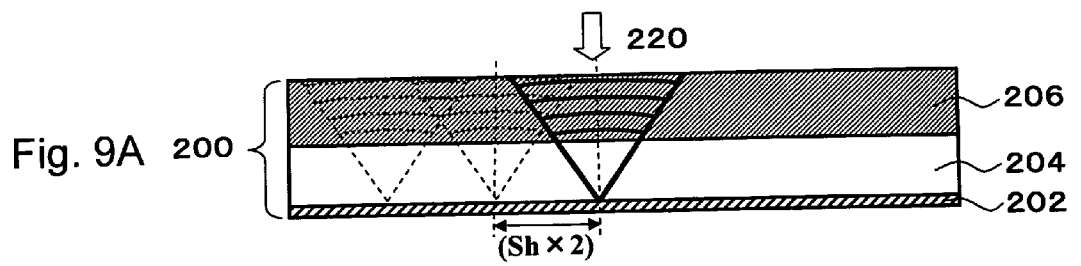
FIGS. 9A through 9D are schematic diagrams showing recording procedures in the case of n=2.
Figure 9B:
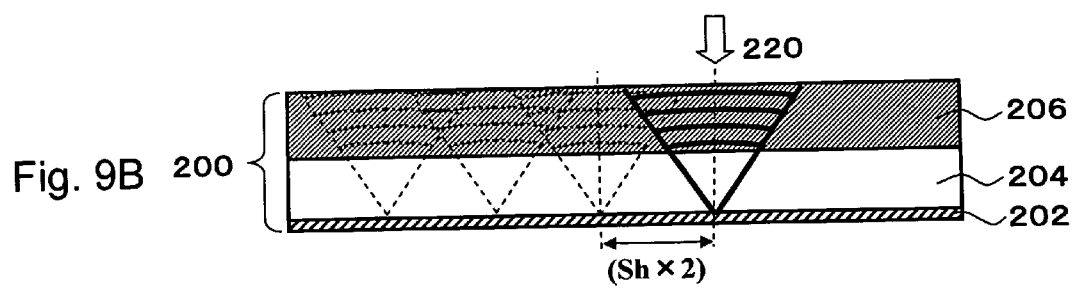
Figure 9C:
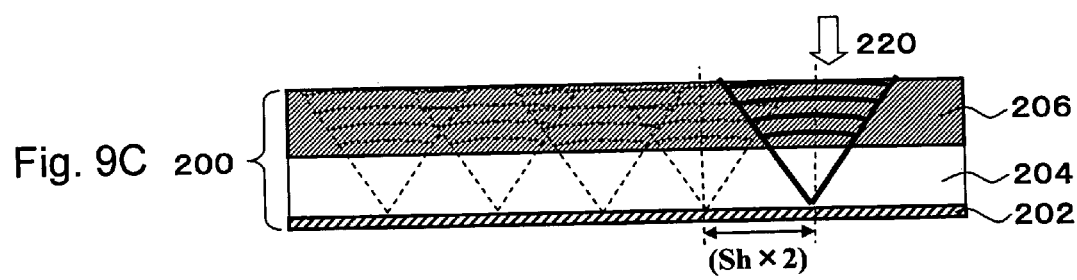
Figure 9D:
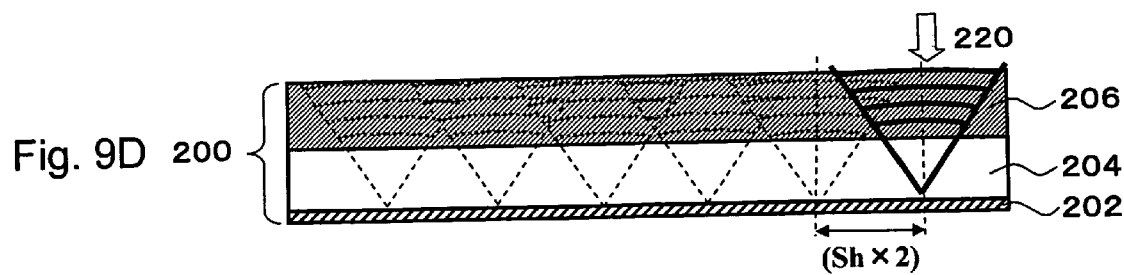

FIGS. 5 through 7 are schematic diagram explaining the principal of the reflection-type shift multiplexing recording. The medium 200 comprises a reflection layer 202 which is located in a focal point and a servo plane, a transparent plate 204 and a holographic recording layer 206. A recording/reading and a servo light enter from the recording layer side of the medium, are reflected at the reflection layer 202 and return to the same optics as the incident optics system 150. The transparent plate 204 is not necessarily required, but it is desirable that the transparent plate 204 and the recording layer 206 have thickness of 300 μm, for example, for compatibility with DVDs.

FIG. 5 is a schematic diagram explaining the recording principal of the interference pattern in the case of the optics system 150 shown in FIG. 4. Although the object beam L1 and the reference beam L2 enter both sides of the divided line 162A on 2-divided wavelength plate (or gyrator) in FIG. 4, the diagram in FIG. 5 is represented for simplicity such that the object beam L1 (S-polarized light) enters the left portion of the divided line 162A and the reference beam L2 enters the right portion of the divided line 162A. In this case, the gyrator 162 functions so that the polarized plane is rotated −45° when the light propagates downward in the left portion of the divided line 162A (inversely, +45° for propagating upward). Also, the gyrator functions so that the polarized plane rotates +45° when the light propagates downward in the right portion of the divided line 162A (inversely, −45° for propagating upward).

The S-polarized light which passes through the left portion of the gyrator downward rotates the polarized plane to S−45° (S minus 45°) and enters the medium 200 through the objective lens 163. The object beam L1 of S−45° reflected at the reflection layer 202 of the medium 200 propagates upward in the right portion of the reflected position. On the other hand, the P-polarized light which passes through the right portion of the gyrator downward rotates P+45° (P plus 45°) that coincides with the polarized plane of the S−45°, and enters the medium 200 through the objective lens 163.

The reference beam L2 of P+45° and the object beam L1 of S−45° interfere each other in the recording layer 206, and the interference pattern 220 modulated along a concentric wave-front is formed as shown in FIG. 5 (only a wave-front is shown for simplicity). Since times of 0.1 to 1 ms are necessary to record an interference pattern (or a frame), the object beam and the medium 200 have to be left stationary. In order to read the recording pattern shown in FIG. 5, only the reference beam L2 of P-polarized light is irradiated. The incident light of P+45° into the recording layer 206 returns to the same optical path as the incident path due to the first order diffraction by the interference pattern. This diffracted light becomes the P-polarized light again by passing through the objective lens 163 and the gyrator 162 wherein P+45°−45°=P. As shown in FIG. 4, the P-polarized light passes directly through the PBS, enters the CCD 171 and generates the regeneration signal. A part of the regeneration signal propagates directly without the diffraction, is reflected at the reflection layer 202 which is located in the focal point and propagates toward upper and left direction in FIG. 5. Since this light becomes S-polarized light by passing through the gyrator 162 via the objective lens 163 (i.e. P+45°+45°=S), the light turns to the left 90° by the PBS in FIG. 4 and do not enter the reading optics. Since the transmitted light which is not diffracted becomes a noise component, it is an advantage of the optics of FIG. 4 that a noise component does not enter the reading optics.

FIG. 6 is a graphical representation showing a status that the medium 200 is rotated a small angle by the rotation of the rotating member 130. In this figure, it is shown that the medium 200 is shifted by n times of the recording shift amount (Sh×n) toward the left direction of the central axis of the objective lens 163 after a frame recording. The "recording shift amount" (Sh) is a spatial separation corresponding to a recording pitch of the recording layer 206. In other words, when the recording is carried out sequentially by rotating the medium small angle according to this embodiment, the interference patterns 220 are arranged with a predetermined pitch finally. This arranged pitch of the interference patterns is defined as "recording shift amount".

The interference pattern 220 is recorded so as to form a concentric wave-front around a focal point 210 in the recording layer 206 of the medium 200. This moving distance (Sh×n) is extremely small. However, according to this embodiment, extremely small movement is achieved by very simple constitution accurately and with excellent reproducibility.

FIG. 7 is a graphical representation showing the state that after the movement of Sh×n the next frame is recorded in the stationary medium again. When the moving distance is selected appropriately, for example, between 5 to 10 μm, the wave-fronts shift between the interference pattern 220A before the movement and the pattern 220B after the movement. Therefore, although the reading light passes through the same position physically in the case of reading of the pattern 220A and also in the case of reading of the pattern 220B, each pattern can be read independently without affection.

The recording shift amount and a track pitch can be selected freely. If Sh is 20 μm and TP is 30 μm so that the pattern interference (tangential) and a cross-talk (radial) satisfy the tolerable limit determined by the system requirement and the recording radial position is within 25-55 mm, extremely large capacity such as TB level can be achievable.

FIG. 8A through 8D are schematic diagrams showing recording procedures in the case of n=1 according to the embodiment. As shown in FIGS. 8A through 8D, when the moving distance between recording is Sh×1 (or the recording shift amount), the interference pattern 220 is recorded successively by shifting the medium intermittently by a recording pitch of the pattern arrangement in the medium.

FIGS. 9A through 9D are schematic diagrams showing recording procedures in the case of n=2. When the moving distance is Sh×2 (or the two times of the recording shift amount), the interference pattern 220 is recorded successively with a double spacing of the final recording pitch on the medium finally. In this case, another pattern can be recorded between above patterns in another recording step.

FIGS. 10A through 10D are schematic diagrams showing recording procedures in which the new pattern is recorded between the already recorded patterns in the case of n=2. FIG. 10A shows a state that the pattern 220 is recorded in the case of n=2 on the medium. The spacing between the patterns is Sh×2. In order to record another pattern between above patterns in FIG. 10A, the medium should be shifted by a distance of Sh. If the medium is rotated by inertia by disconnecting the rotating member 130 from the medium after the shift of a distance of Sh×2, the medium can be shifted by a distance of Sh.

After the medium 200 is shifted by a distance of Sh, the interference patterns 220 are recorded with a spatial spacing of Sh×2 additionally, as shown in FIGS. 10B through 10D. Thus, the interference pattern 220 is recorded in the medium with a pitch of Sh.

In order to accomplish the reflection-type shift multiplexing, the light and the medium have to be left stationary during predetermined times of 0.1-1 ms. The basic conception of this invention is described below. A frame is recorded by leaving the medium and the light L stationary as shown in FIGS. 5 through 7. The light L is not irradiated and the medium is shifted (or rotated) by a distance of Sh or Sh×integer during a transition to the next frame (the servo light may be irradiated or not). Subsequently, the next frame is recorded again by leaving the medium and the light L stationary.

How to select integer n will be explained below. As shown in FIG. 3, the medium 200 has an inner aperture 200A which can be used for chucking so as to connect to the spindle motor 110 as well as in CDs and DVDs. The center of the medium 200 is Od, the disc radius is Rd, the recording radius is Rr, the stepping angle of the rotating member (equivalent to that of the stepping motor) is θc and the medium rotating angle corresponding to θc is θd.

As shown in FIG. 3, the next formula consists:

$$Rd \times \theta d = Rc \times \theta c \quad (1)$$

Also, the moving distance may be expressed as follows:

$$Sh \times n = Rr \times \theta d \quad (2)$$

Substituting the formula (1) into the formula (2), the following formula consists:

$$Sh \times n = [(Rr \times Rc)/Rd] \times \theta c \quad (3)$$

A representative stepping motor 140 is a permanent magnet type (PM) or a hybrid type (HB). The permanent magnet type is inexpensive but has a relatively rough stepping angle θc of 7.5-15°. On the other hand, a hybrid type is expensive but has a relatively fine stepping angle θc of 0.9-3.6°. In both types, since the accuracy of the step angle is within a range of 3-5% and the error does not accumulate between the steps, highly accurate positioning and repeatability can be obtained. In this embodiment, either the PM type or the HB type can be used and its step angle can be selected appropriately within the above-mentioned range in accordance with Rr.

The example of the hybrid type stepping motor is explained below. In the case of n=1, θc=0.9° (or 0.0157 radian) and Rr ranging from 25 to 55 mm, Rr/Rd becomes within a range of 0.417-0.917. When the recording shift amount Sh is 20 μm wherein Rr=25 mm, Rc becomes 3.06 mm. Therefore, the diameter of the rotating member is 6.12 mm and this dimension is practical sufficiently. When the rotating member has a cylindrical shape with a constant Rc, the recording shift amount Sh becomes greater in accordance with the increase of Rc. In above example, the recording shift amount becomes 44 μm wherein Rr=55 mm. There exists a trade-off that the interference between the patterns along a tangential direction becomes relaxed at a larger radius position (outer portion), but the recording density becomes low. Since the recording shift amount is preferably determined so that the interference between the patterns can be allowed even in the case of Rr=25 mm (or the most inner radius) in system requirement, the recording capacity becomes lower at the most outer portion of the medium. An advantage is that the shape of the rotating member is simple and it is not required to control the tangent position with the medium precisely.

Since the rotating angle θd of a step becomes smaller for the smaller diameter of the rotating member, the recording shift amount Sh can be same in the inner and the outer portions for the equipment shown in FIG. 2 if θc is set larger at the inner portion of the recording radius and smaller at the outer portion.

For example, in order to obtain the recording shift amount of 20 μm in the case of Rr=55 mm, the diameter of the rotating member 130 may be 1.39 mm (this is also practical). Since the recording is carried out at the position of Rr=25 mm without changing of θc, Sh becomes 0.45 μm and hence the interference along the tangential direction increases. If the θc is 0.0345 radian (2°), the recording shift amount Sh becomes 20 μm as well as at the most outer portion. Even in an arbitral position except Rr=25 mm or 55 mm, Sh can be kept constant regardless of the recording radius position when θc is adjusted.

Furthermore, while n=1 in the formula (3) in above example, the radius of the rotating member 130 and θc can be larger. As a result, an advantage occurs such that an inexpensive PM type stepping motor can be used. It is desirable that the control signal is recorded at the head of the recorded sector for the larger n and the sector recorded for n>1 is recorded at a position between the already recoded positions. Since this case relates to the entire system control, the detailed will be described later.

Figure 11:
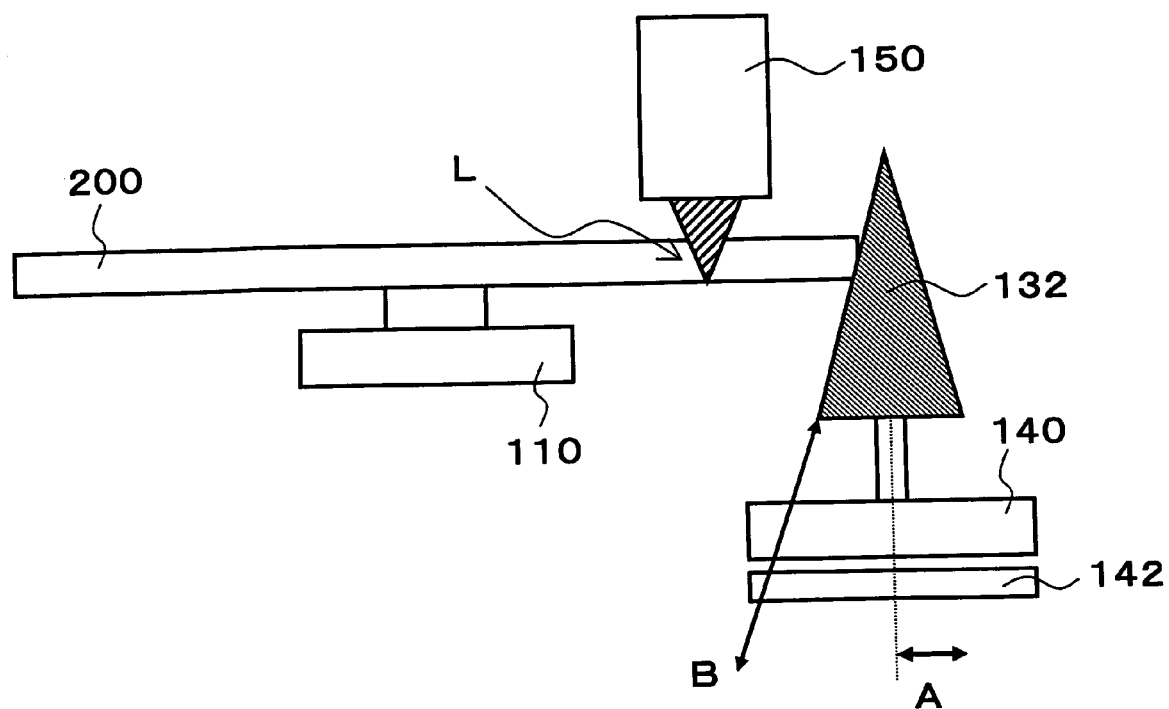
FIG. 11 is a schematic diagram of the holographic data storage equipment of a second example according to the embodiment.

FIG. 11 is a schematic diagram showing a second example of the holographic data storage equipment. The major difference in comparison with the first example is that the rotating member has a circular corn shape approximately and this rotating member 132 has a mechanics moving upward and downward in touch with the medium. The rotating member 132 is movable toward B direction as well as A direction.

The reason why the circular corn shape is used is that the recording shift amount Sh can be constant by the simple method regardless of the recording radius, even if θc is not controlled in accordance with the recording radius and the recording corresponding to n>1 is not carried out.

The case of n=1, θc=0.9 (or 0.0157 radian) and Rr ranging from 25-55 mm is explained below. When the recording shift amount Sh is preserved to be 20 μm regardless of recording radius, the radius of the rotating member may be 3.06 mm for Rr=25 mm and 1.39 mm for Rr=55 mm. In other words, if the radius of the circular corn (or frustum of a corn) is 3.06 mm at a larger radius portion and 1.39 mm at a smaller radius portion, and the radius of the rotating member is controlled in accordance with the recording position on the medium, then the recording shift amount Sh can be preserved constant regardless of the recording radius without θc control and, the recording of n>1. As a result, since the recording density can be constant substantially on the medium, the holographic data storage equipment having the larger capacity is achievable. In this case, the radius of the rotating member is varied at a position tangent to the medium by moving the stepping motor 140 into the tilted direction B, as shown in FIG. 11.

Figure 12:
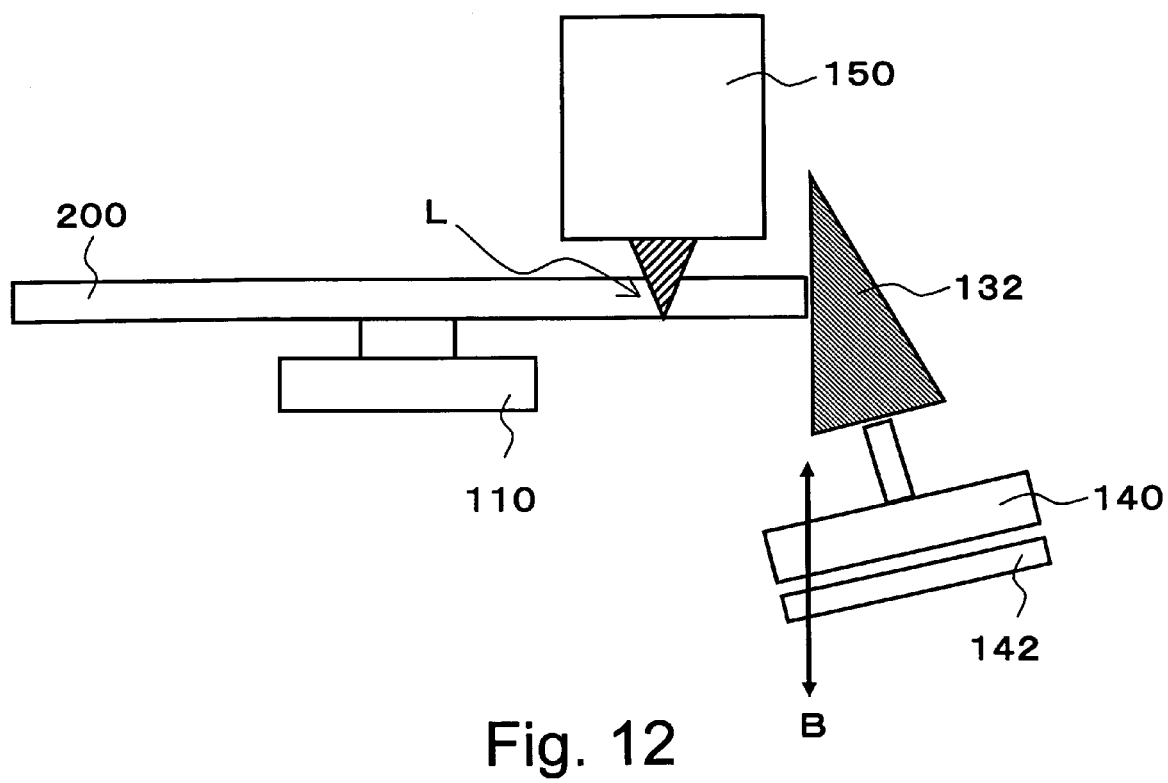
FIG. 12 is a schematic diagram of a third example of the holographic data storage equipment according to the embodiment

FIG. 12 is a schematic diagram showing a third example of the holographic data storage equipment. The constitution of the second example shown in FIG. 11 has a complicated mechanism because the rotating member of the circular cone moves toward the direction B inclined to the medium 200. On the contrary, the rotating member 132 is provided at an inclined angle to the medium surface so that the side surface of the rotating member touches the side surface of the medium 200 in this example. Since the rotating member may be moved only upward or downward perpendicularly to the medium, as shown by the arrow "B", the mechanics become simple.

Figure 13:
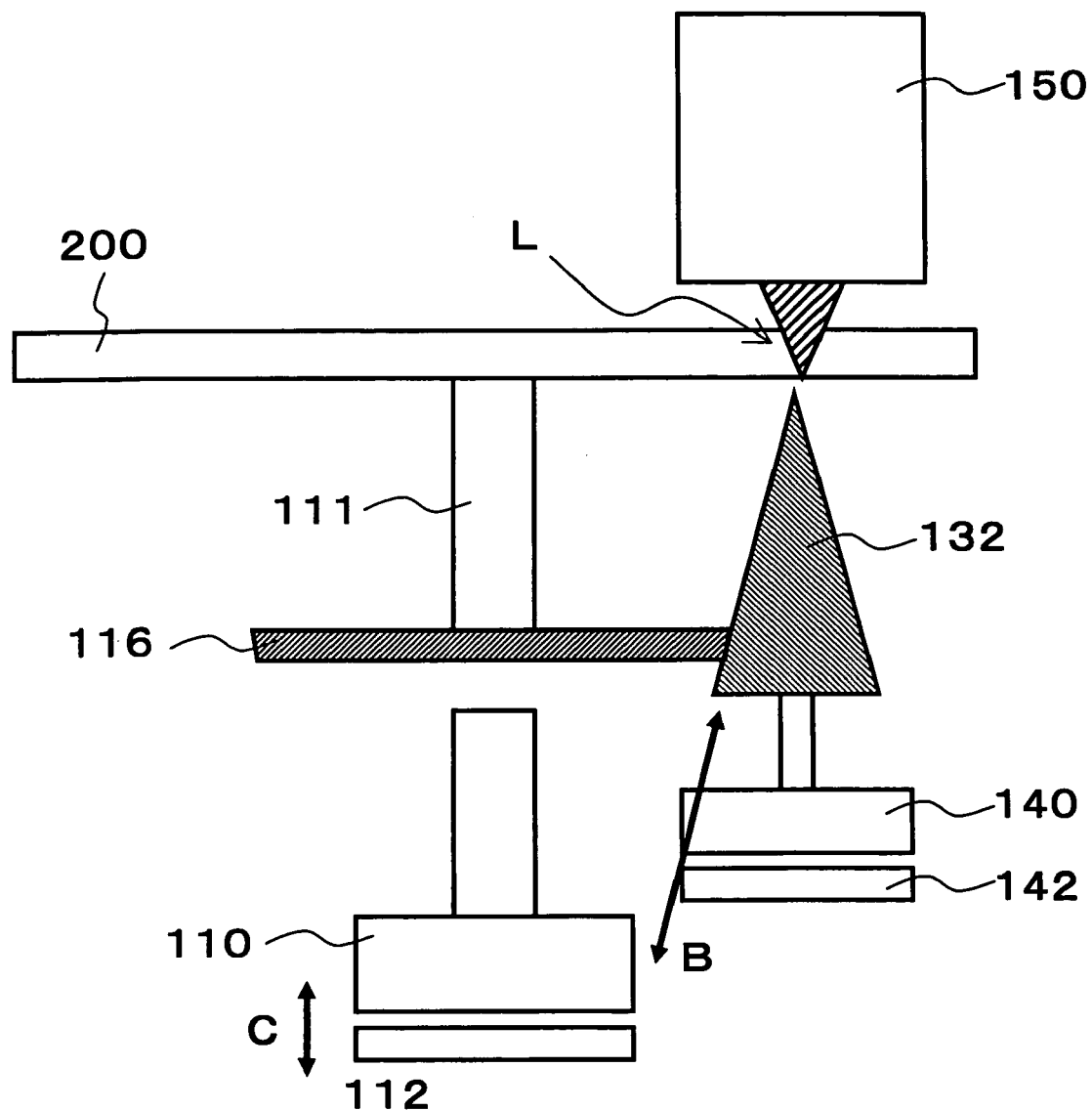
FIG. 13 is a schematic diagram of a fourth example of the holographic data storage equipment of according to the embodiment.

FIG. 13 is a fourth example of the holographic data storage equipment. In the above-mentioned examples, the rotating member 132 touches the circumference of the medium 200 mechanically. In contrast to this, the rotating member (circular cone or cylinder shape) 132 may touch an auxiliary member 116 which is fixed to a rotation axis 111 of the medium 200. The small amount of rotation is transmitted to the medium 200 through the auxiliary member 116.

According to this example, since the material of the auxiliary member 116 can be selected widely in comparison with the constitution where the rotating member touches the medium circumference, the mechanical contact can be obtained surely by improving the friction. When the rotating member 132 has a cylinder shape, inequalities such as the gear may be provided on both sides of the rotating member 132 and the auxiliary member 116 in order to make the mechanical coupling sure.

As shown in FIG. 13, the spindle motor can be moved toward the direction "C" and disconnected with the rotation axis 111 by providing the spindle motor moving portion 112. In this constitution, the cogging torque due to the spindle motor 110 is not loaded and hence the operation becomes smooth in the case of the small rotating step. This feature is particularly advantageous when the medium is shifted by a distance of Sh by inertia, as described later. Also, this spindle motor moving portion can be used in all holographic data storage equipments according to this embodiment of the invention.

Although the radius of the auxiliary member is smaller than the medium radius, the embodiments are not restricted to this. The greater the radius of the auxiliary member, the smaller the stepping angle. Since the radius of the circular cone and the step angle of the stepping motor 140 can be large for the same step angle, the inexpensive permanent magnet type stepping motor can be used.

Figure 14:
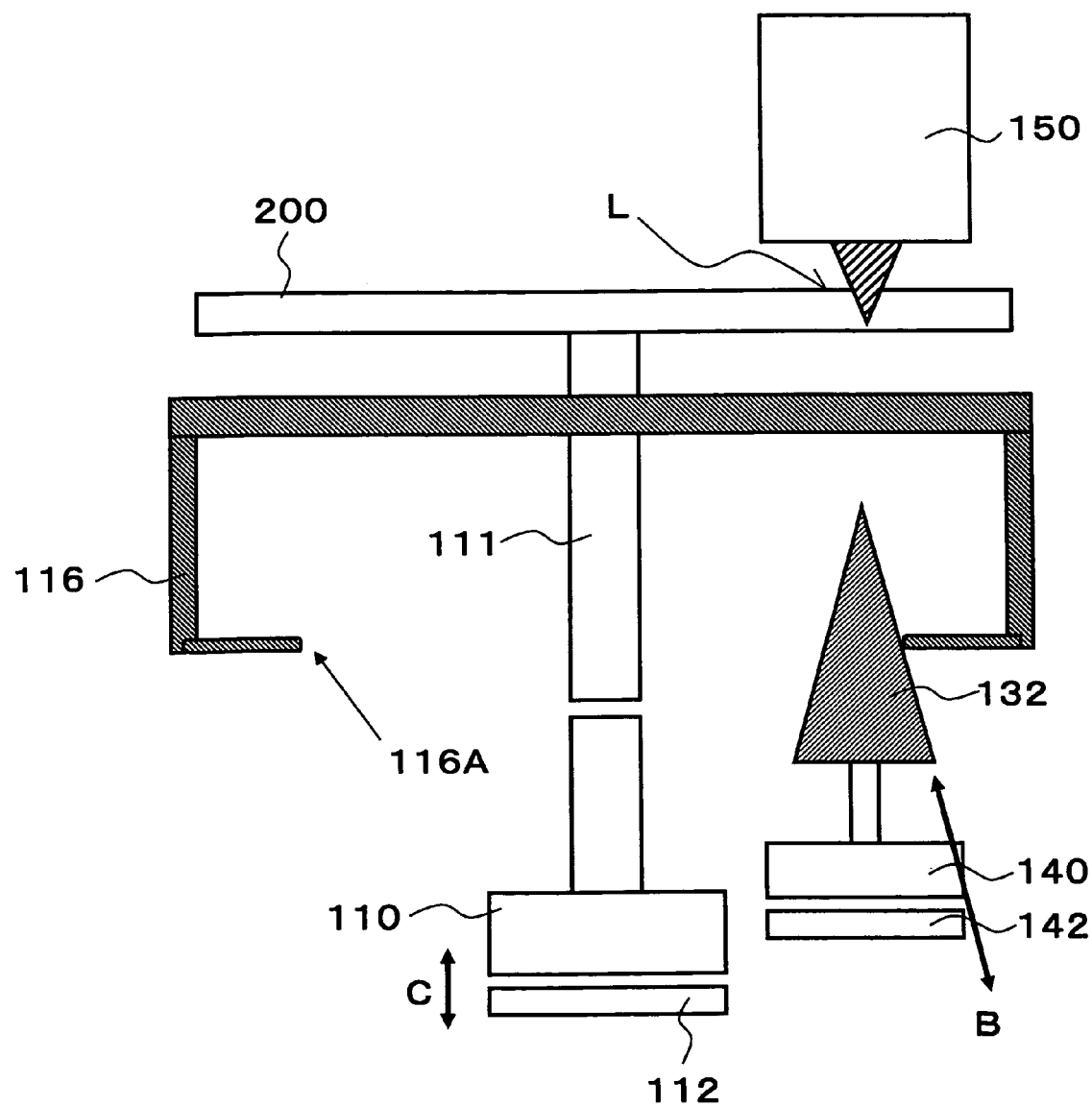
FIG. 14 is a schematic diagram showing a constitution that the hollow auxiliary member fixed to the rotation axis is tangent to the rotating member at the openings.

As shown in FIG. 14, the rotating member of the circular cone shape 132 (or cylindrical shape) may touch the openings end 116A of the hollow auxiliary member fixed to the rotation axis 111. In the case of the small angle rotation using the auxiliary member, the auxiliary member and the optics may be disposed on the opposite side of the medium or on the same side of the medium.

Figure 15:
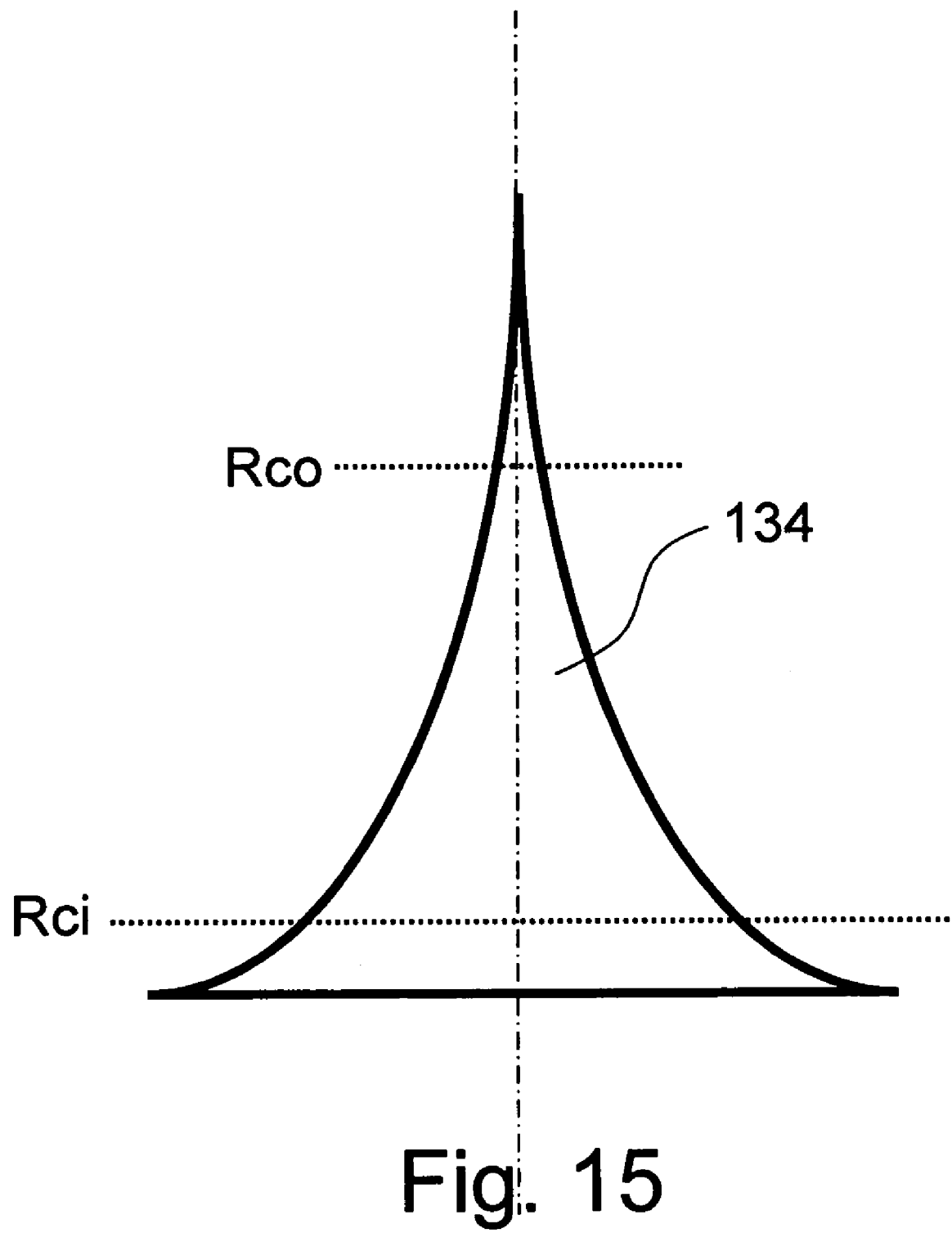
FIG. 15 is a schematic diagram showing the rotating member of the holographic data storage equipment of the fifth example.

FIG. 15 is a graphical representation of the rotating member in a fifth example of the holographic data storage equipment.

Figure 16:
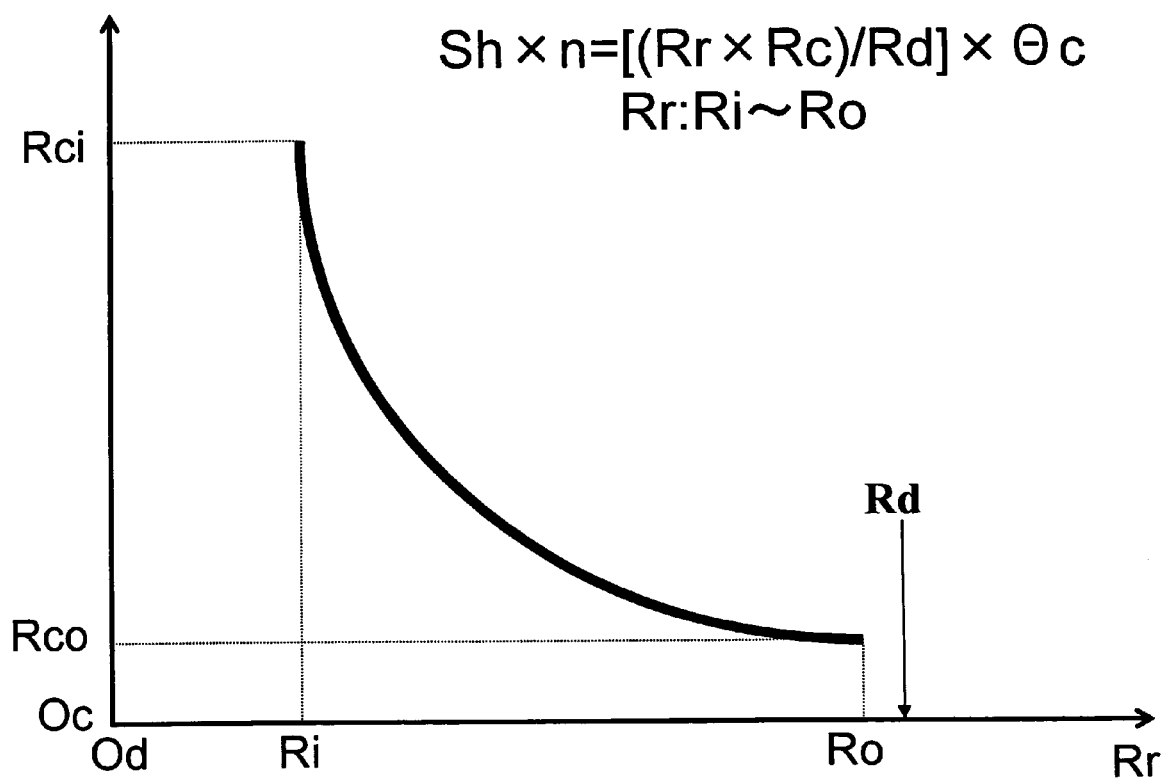
FIG. 16 is a graph explaining the function in the fifth example.

FIG. 16 is a graph explaining its function.

The recording shift amount Sh or the shift distance Sh×n is proportional to Rr×Rc, as shown in formula (3). When the rotating member 132 of the circular cone shape having an approximately linear side portion is used, the moving distance toward upper or lower direction is non-linear in accordance with Rr. After Rr detection, the rotating member has to be moved non-linearly upward or downward so that Sh or Sh×n becomes constant for each Rr. As a result, the control becomes complicated.

In order solve overcome this drawback, the side shape of the rotating member is determined so that Rr×Rc is constant approximately in this example. FIG. 16 is a graph representing a relation between the recording radius position Rr and Rc under the condition of constant RrRc product, wherein Ri represents a minimum radius (25 mm in this example) and Ro represents a maximum radius (55 mm in this example). It is understood that Rr×Rc becomes constant approximately if Rc is a hyperbolic function of Rr.

FIG. 15 is a schematic diagram of the rotating member 134 which is examined according to this relation. When the rotating member 134 having a cross-section shown in FIG. 15 is used so that the medium (or auxiliary member) is combined with a rotating member at a smaller radius in the case of larger Rr and at a larger radius in the case of smaller Rr mechanically, the Sh and the recording capacity on the medium can be kept constant only by moving the rotating member linearly upward or downward without θc control or the recording corresponding n>1. As a result, the larger capacity storage can be achieved.

Figure 17:
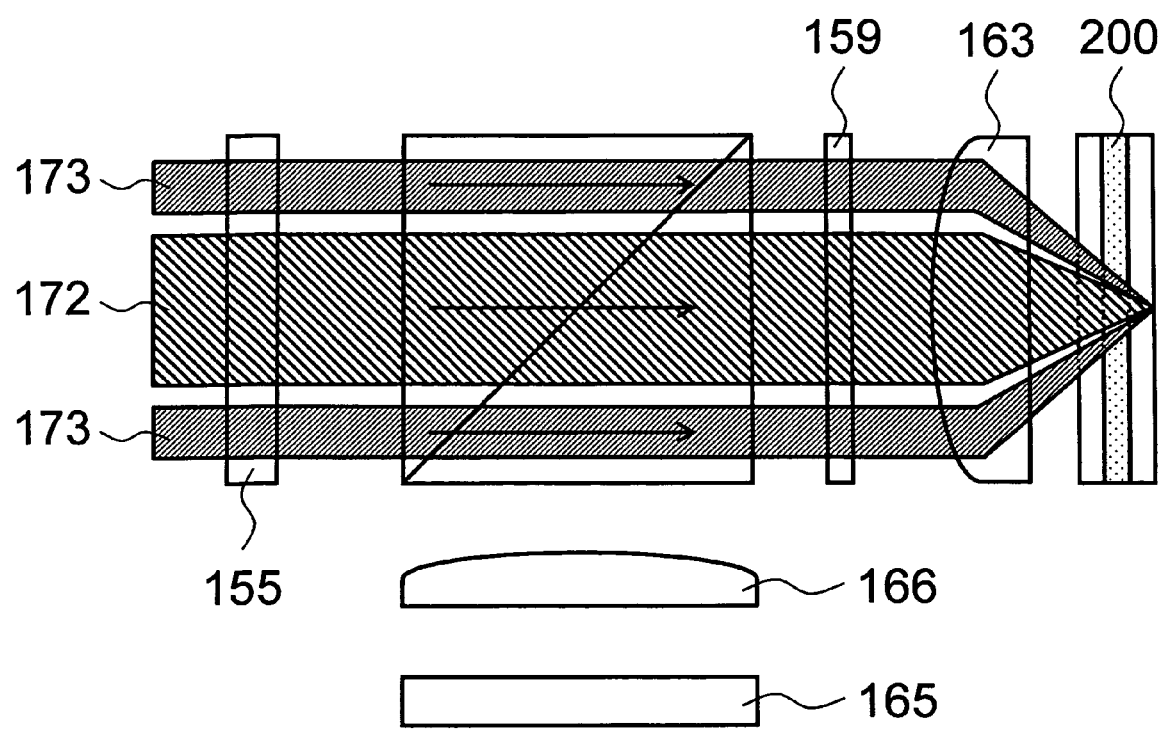
FIG. 17 is schematic diagram showing a sixth example of the holographic data storage equipment.

FIG. 17 is a schematic diagram showing a sixth example of the holographic data storage equipment according to the embodiment. In this example, an optical configuration has a feature. The data storage method using this configuration is called an "advanced reflection type collinear holographic recording method". Although a beam divided into two portions by a wavelength plate (or gyrator) in FIG. 4, an inner part 172 of a beam functions as an object beam and an outer part 173 of a beam functions as a reference beam in the case of recording in FIG. 17. The beam having the inner part 172 and the outer part 173 is modulated by the spatial light modulator 155 respectively and focused by an objective lens at the reflection layer. When the beam enters the recording layer, the interference pattern is obtained due to the interference between the reference beam component and the objective beam component.

Figure 18:
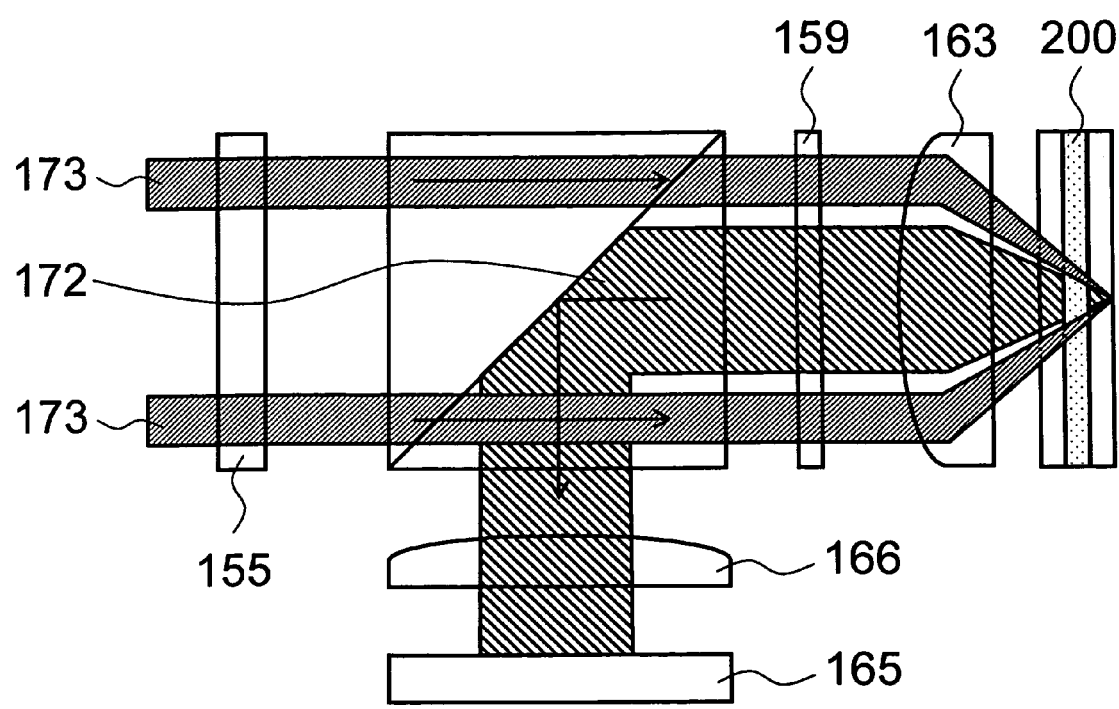
FIG. 18 is a schematic diagram showing a sixth example in the case of reading.

Also, FIG. 18 is a schematic diagram showing a sixth example in the case of reading. In this case, only the outer part 173 of the beam (or the reference beam component) is irradiated into the recording layer, diffracted by the interference pattern and retrieved. Since a λ/4 plate 159 is disposed between the PBS 158 and the medium 200, the returning light is folded by the PBS 158 and enters the CCD 165 or the CMOS sensor. Although the interference pattern includes a parallel component to the medium relatively much in configuration in FIG. 4, the interference pattern includes a perpendicular component to the medium dominantly in this embodiment. As a result, tolerance for disc tilt and beam wavelength becomes high.

Figure 19:
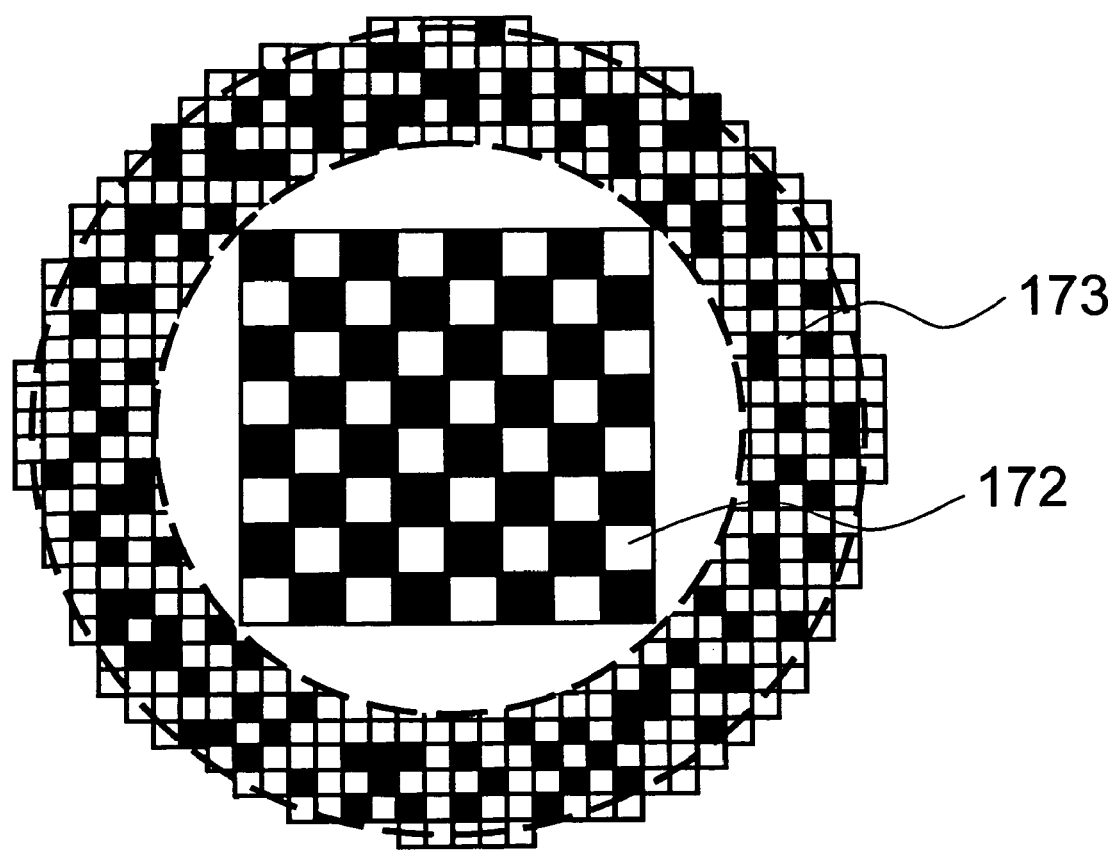
FIG. 19 is a schematic diagram showing a light-or-dark pattern modulated by the SLM.

FIG. 19 is a schematic diagram showing an example of light-or-dark pattern modulated by the spatial light modulator SLM 155.

Figure 20:
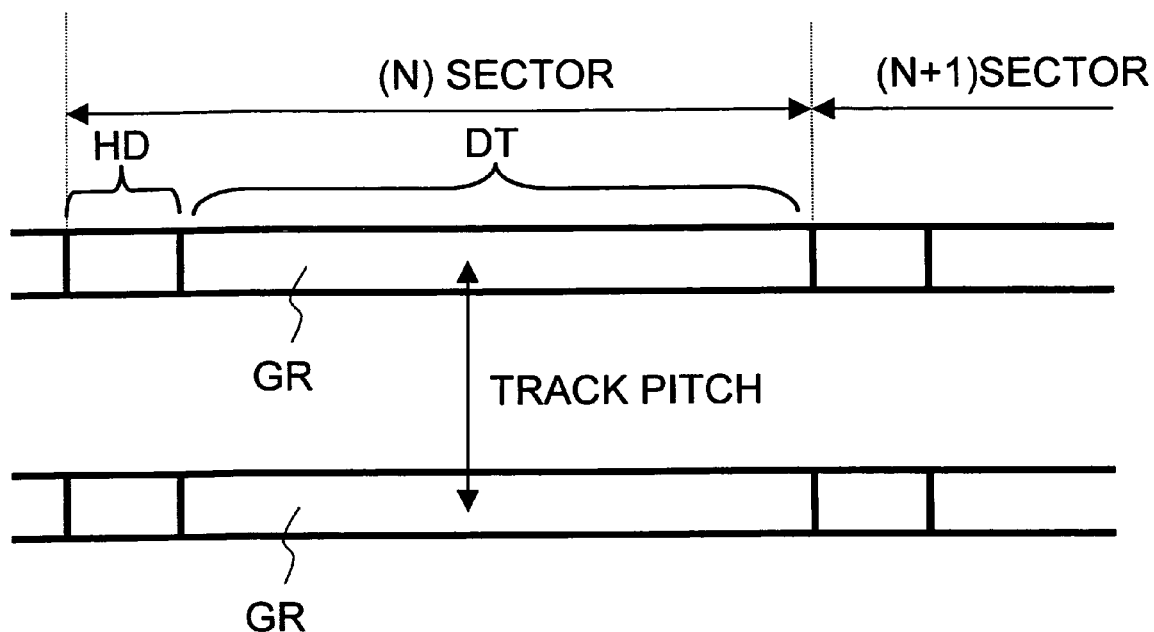
FIG. 20 is a schematic diagram showing a constitution of a servo plane having a reflection layer in FIGS. 5 through 7.
Figure 21:
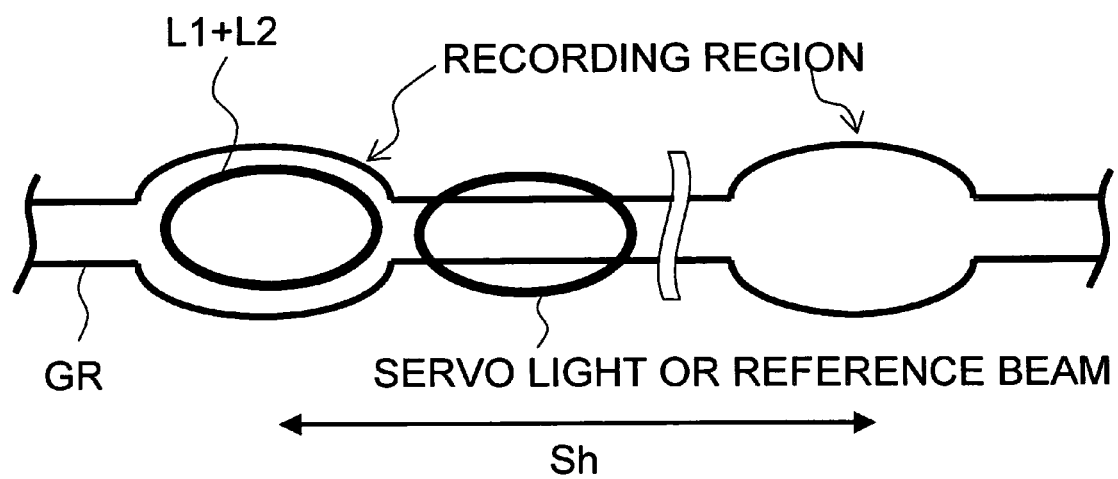
FIG. 21 is a schematic diagram showing an example of a constitution of the data region in which the recording position is specified.
Figure 22:
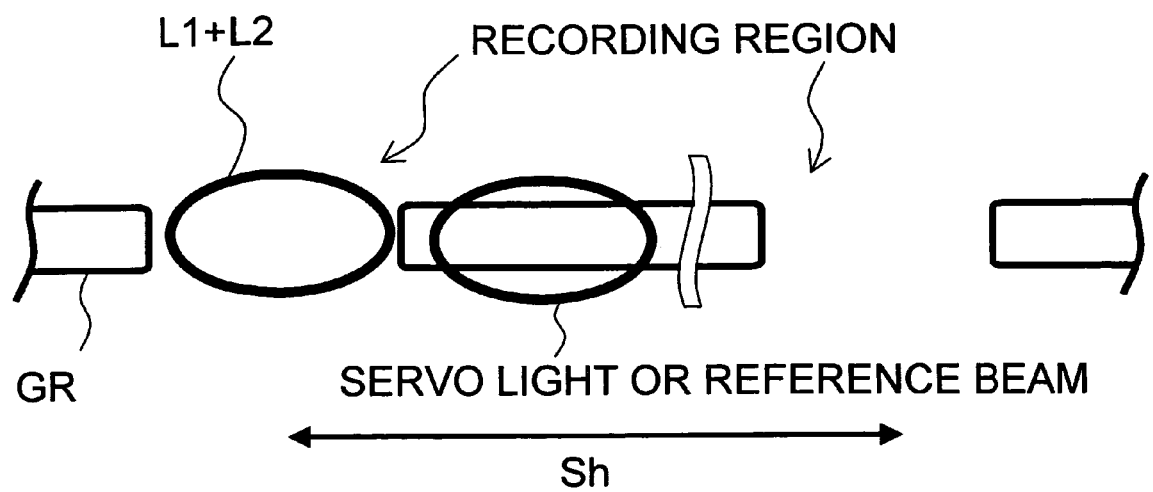
FIG. 22 is a schematic diagram showing an example of a constitution of the data region in which the recording position is specified.

FIGS. 20 through 22 are a schematic diagram explaining a seventh example. FIG. 20 shows a constitution of the servo plane on the reflection layer 202 and is a schematic diagram viewing from the disc surface toward the servo plane.

In general, a track (full circle) of the optical disc comprises a lot of sectors. The data are recorded and read in a sector unit. Each sector has a header portion HD and a data portion DT. The header portion HD comprises the address information of the sector and the control information for recording/reading. The data portion DT comprises user data. The data portion may comprise a mirror surface or a grooved surface for tracking guide. This example is applicable for both surfaces.

The case in which the data portion has a groove GR and the recording/reading position is specified in this groove GR is described in detail. FIGS. 21 and 22 are the examples showing the data portion in which the recording region is specified. In order to obtain a fine and undistorted interference pattern in the medium, it is desirable that the recording/reading region in the data portion DT is a mirror surface for the recording light (the object beam L1 and the reference beam L2) and the reading light (the reference beam). The recording/reading is not carried out in the position except the position determined by the shift amount Sh in the reflection-type shift multiplexing of holographic data storage. Therefore, the groove GR is provided between the two recording/reading regions so that the tracking servo system functions, and the substantial mirror surface for the recording light is provided in the recording/reading region, as shown in FIGS. 21 and 22. Thus, the medium in which the recording region is specified is obtained. In addition, the technique relating to recording region specified medium is disclosed in Japanese Patent Application No. 2003-131611 by the Inventors.

According to this invention, the recording shift amount Sh is determined by the rotation step angle θc of the stepping motor basically. And the more accurate recording/reading becomes possible by combining this embodiment of the invention with the technique disclosed in the above Application.

Since the servo or the reference light is irradiated into the region except the recording/reading region, the continuous tracking servo system can be operated. In the recording/reading region, the width of the groove is larger than the size of the recording light (L1+L2) shown in FIG. 21, or the mirror surface is provided shown in FIG. 22. It becomes possible that the position for the recording/reading is detected because the tracking signal changes or disappears. The stepping motor stops in this recording/reading region. As described hereinbefore, the step angle is 0.9° minimum with an accuracy of ±3-5% in the case of the hybrid type stepping motor. The width of the recording/reading region is determined so as to be wider than the distance corresponding to the step angle accuracy. Thus, when the medium stops, the recording/reading light is irradiated into the mirror surface.

Furthermore, if the rotating member of the circular cone 132 (or the rotating member 134) is moved upward and downward slightly by a voice coil motor, the step angle can be changed freely and slightly. Even if the stepping motor rotating intermittently is used, the recording shift amount can be changed slightly and freely (by fine tuning of Rc). The medium and the stepping motor are rotating during the tracking servo detecting. After the recording/reading region is detected by the servo signal, the rotating member of the circular cone shape is moved slightly upward and downward so that the recording/reading light is irradiated into the approximate central position of the recording/reading region when the stepping motor stops.

As shown in FIGS. 21 and 22, when the medium moves from the servo region to the recording/reading region, the servo signal changes. If the rotating member is moved upward or downward slightly during detecting this signal, the recording/reading light can be irradiated into the center of the specified region on the medium. When the friction causes some problem in this case, the rotating member 132 (or 134) may be disconnected with the medium 200 or the auxiliary member 116. Since this small movement of the rotating member is carried out by the voice coil motor within shorter times, the medium is rotated with a constant speed by the inertia during disconnected period.

Another method for fine tuning of the step angle is such that the stepping motor moving base 142 may be rotated slightly and freely by the voice coil motor. In this case, the friction problem does not occur in accordance with the movement of the rotating member 132 (or 134).

In this embodiment, the undistorted and fine interference pattern can be obtained using basic continuous servo method having excellent compatibility with current medium for DVDs and CDs. Also, the stationary recording which is a basic conception of this invention can be accomplished with a high accuracy.

The example of n>1 will be explained hereinafter, referring to FIGS. 20 through 22. In order to carry out n>1 recording, in the data region shown in FIG. 20, the servo pattern may be provided, as shown in FIGS. 21 and 22, although this embodiment is possible even in sampling servo system for the entire mirror surface data region. When the light moves from the header region HD to the data region DT, the recording is carried out so that a step (or many steps) of the stepping motor 140 corresponds with the recording shift amount Sh for n=1.

On the other hand, n is recorded at an ending position in the header region HD for n>1. Since data ranging from 0.1 to 1 Mbit are recorded in one big data block by the hologram data storage, n can be selected up to $10^6$ by changing the pattern of the spatial light modulator the SLM 155. Actually, since the radius of the rotating member can be within a practical range of 1.39-3.06 mm for n=1 by selecting the HB type stepping motor 140 appropriately, it is not required that n is large number.

When the minimum step angle of the inexpensive PM type stepping motor is 0.13 radian and the radius of the rotating member is within a range 1.45-3.19 mm, the medium shifts by a distance of 160 μm by the stepping motor 140. If the recording shift amount Sh is 20 μm, the distance corresponding to n=8 is shifted by the stepping motor. In this case, n=8 is recorded at an end position in the data region. The recording position is selected from 1 to 7 bit in front of the record start position in the data region on the servo plane located in the focal point. If the position of 1 bit in front of the data region is selected, the step recording starts at seventh bit in the data region. And if the position of 7 bit in front of the data region is selected, the step recording starts at first bit in the data region. The recording spacing is 8 times of the recording shift amount (or n=8).

When the recording is carried out in the recorded sector by n=8, n=8 is read by the reference beam on the servo plane. If the step reading is also carried out by the step, the first recording position is shifted by an amount of Sh according to n=8 (corresponding to n+1 and 1 bit). The method for shifting is such that the rotating member 130 may be disconnected slightly with the medium and driven by inertia during the movement to the first step. It is desirable that the medium is used in which the recording region is specified (shown in FIGS. 21 and 22) in order to record in the predetermined position by inertial medium drive. If the above operations are repeated 7 times totally, the recording can be carried out in all data regions for the shift amount Sh of 20 μm.

When the reading is carried out by continuous rotation of the spindle motor, the signal showing n=8 is detected at the end portion of the header in the sector recorded for n=8. Subsequently, before a lap of the medium, the spindle motor is halted and the stepping motor is rotated from the position which is shifted by a spacing corresponding 1 bit from the n=8 data recorded position. Thus, after the data are recorded with 160 μm spacing, the medium is shifted by 20 μm and the data are recorded again with 160 μm spacing. If the recording are repeated 7 times totally as well as in step reading, the data can be recorded in entire recording region by the recording shift amount of 20 μm.

The system of the holographic data storage equipment will be explained as the seventh example of the invention.

Figure 23:
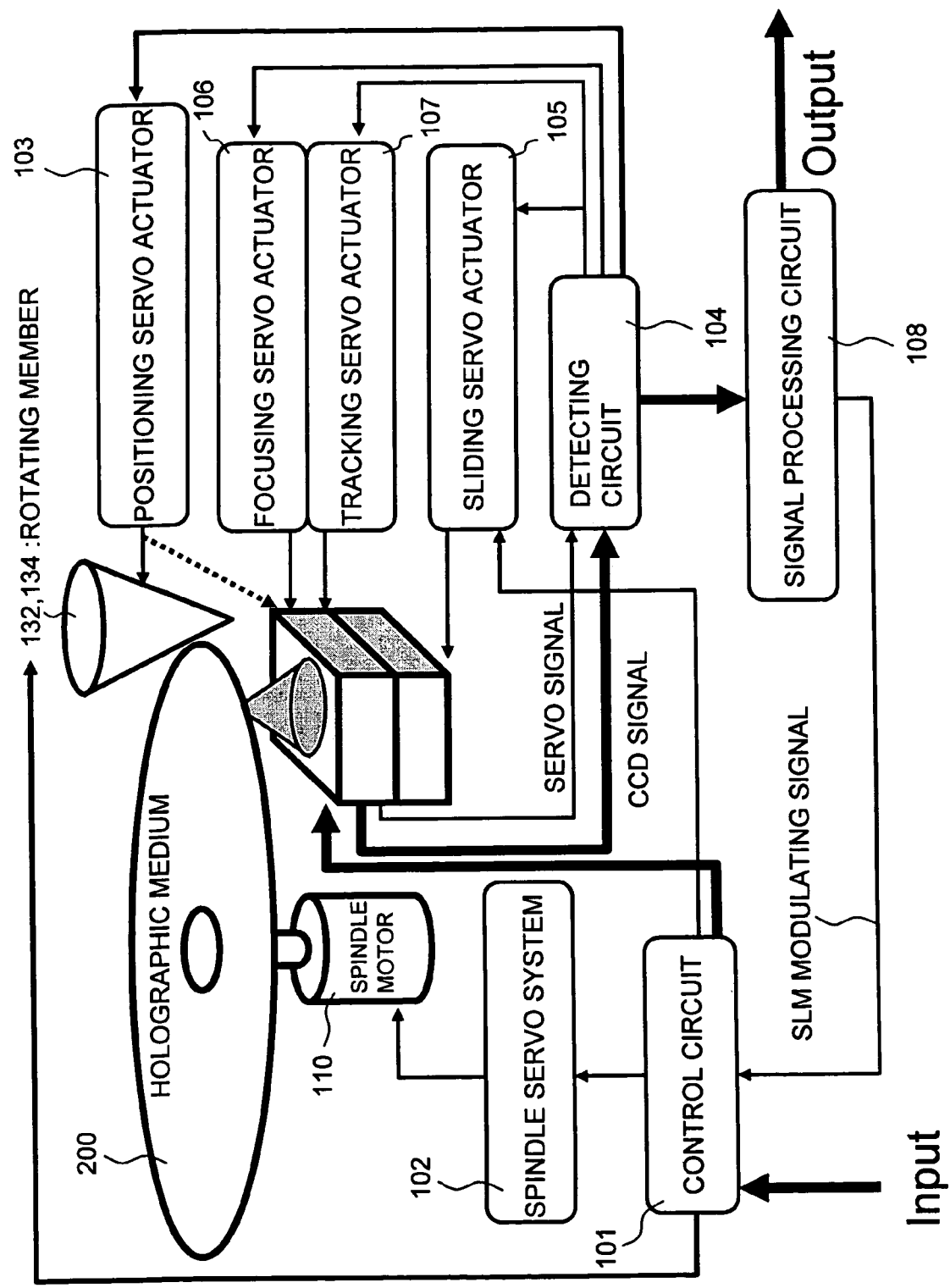
FIG. 23 is a block diagram showing a system constitution.

FIG. 23 is a schematic block diagram showing a system for the holographic data storage. This system can transfer the input/output data to a personal computer and audio/video equipment through the interface. The input signal is delivered to the control circuit 101. For the hologram data retrieval, DVDs drive and CDs drive, the signal to rotate the spindle motor 110 continuously is delivered to the spindle servo system 102. For the hologram data recording and retrieval, the spindle motor is in a free state, or the signal to disconnect the rotation axis of the spindle motor with the medium is delivered to the spindle servo system 102. Simultaneously, the positioning servo actuator 103 of the stepping motor and the rotating member 130 (132, 134) attached thereto are driven.

The example of the system operation will be explained regarding the recording. The control circuit 101 generates a driving control signal, data signal (the SLM modulating and servo light driving), and seek signal in order to control the stepping motor and the rotating member. After focusing by using the servo light and the reference beam, the optical head is aligned to the predetermined track by a seek signal. By tracking using the servo light or the reference beam, the reading and the positioning to the predetermined sector are carried out. These operations are carried out so that the servo signal obtained by the reflected light from the medium is delivered to the detecting circuit 104, and the sliding servo actuator 105, the focusing servo actuator 106 and tracking servo actuator 107 are driven through the detecting circuit 104. After the recording position is specified, the positioning servo actuator 103 is driven so that the radius of the rotating member becomes appropriate according to the recording radius on the medium. The recording starting position of the stepping motor is also controlled by the positioning servo actuator 103. After all positioning are completed, the stepping motor is rotated intermittently and controlled with the predetermined step. The modulated signal by the SLM is recorded on the medium by the irradiation of the object and the reference beam while the stepping motor stops. When the stepping motor is rotating, the servo light or the reference beam is irradiated. Such operation is carried out for the predetermined number of the sectors and the tracks.

In reading operation, the stepping motor is in a free state or the rotating member is disconnected with the medium. The reference beam is irradiated continuously into the medium rotating by the spindle motor 110. Subsequently, after the image is regenerated by the CCDs, the regenerated signal is delivered to the signal processing circuit 108 through the detecting circuit 104. After the appropriate signal processing, the output signal is extracted. A part of the output from the signal processing circuit 108 is delivered to the control circuit 101, and used for the confirmation of the recoding, the confirmation of n and the recording operation of n.

As explained above, according to the conventional technology, the recording is performed by moving a recording light synchronously with a continuously rotating medium during predetermined times. In contrast to this, according the embodiment of the invention, the recording light is always stationary, the medium is rotated intermittently and the recording is carried out only when the medium stops. Since the movement of the optics system and the objective lens are not required in this invention unlike the conventional technology, the optics system becomes extremely simple.

Thus, since the medium can be left stationary during recording times to give a predetermined optical exposure especially in a reflection type shift multiplexing method, the undistorted and fine pattern can be formed.

Additional advantages and modifications will readily occur to those skilled in the art. More specifically a various kinds of constitutional elements such as the motor driving system, the signal processing system, the optical source and the optics system can be used.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is clamed is:

1. A method for storing holographic data in a medium having a reflection layer and a recording layer, comprising:
   recording an interference pattern at a recording position of the recording layer of the medium in a stationary state, the interference pattern being formed by an interference between an object beam and a reference beam, the object beam and the reference beams being irradiated into the recording position of the recording layer from an opposite side of the reflection layer;
   rotating the medium so as to shift the recording position by a distance of n×Sh where n is a positive integer and Sh is a predetermined recording shift amount; and
   repeating the recording and the rotating alternately.

2. The method for storing holographic data according to claim 1, wherein
   the positive integer n is larger than unity, and
   after the interference patterns are recorded with a spatial separation of the n×Sh by repeating the recording and the rotating alternately, the medium is rotated so as to shift a recording position by a distance of Sh.

3. The method for storing holographic data according to claim 1, wherein after the medium is rotated by a driving unit in a state where the medium and the driving unit are mechanically coupled during the rotating, the medium is rotated so as to shift the recording position by the distance of Sh by inertia by releasing the mechanical coupling between the medium and the driving unit.

4. The method for storing holographic data according to claim 2, wherein after the medium is rotated so as to shift the recording position by the distance of Sh, the recording and the rotating are repeated alternately.

5. An equipment for storing holographic data comprising:
   a light irradiating unit which records an interference pattern at a recording position of a recording layer of a recording medium having a reflection layer and the recording layer by irradiating an object beam and a reference beam into the recording position of the recording medium from an opposite side of the reflection layer,
   an intermittent driving unit which rotates the recording medium intermittently so as to shift the recording position by a distance of n×Sh where n is a positive integer and Sh is a predetermined recording shift mount; and
   a control unit which controls the light irradiating unit and the intermittent driving unit so that the recording by the light irradiating unit and the rotation by the intermittent driving unit are executed alternately.

6. The equipment for storing holographic data according to claim 5, further comprising a rotating unit which is provided coaxially with the recording medium and rotates the medium.

7. The equipment for storing holographic data according to claim 5, wherein
   the intermittent driving unit has a motor whose driving axis rotates intermittently and a rotating member which is connected to the driving axis, and
   a rotation of the rotating member is transmitted to the recording medium.

8. The equipment for storing holographic data according to claim 5, wherein
   the rotation of the rotating member is transmitted to the recording medium in a state where a side surface of the rotating member is in contact with a side surface of the recording medium, and
   the equipment further comprises a moving unit which controls a distance between the side surface of the rotating member and the side surface of the recording medium.

9. The equipment for storing holographic data according to claim 7, wherein
   the rotating member has a cylindrical form, and
   the rotation of the rotating member is transmitted to the recording medium in a state where a side surface of the rotating member is in contact with a side surface of the recording medium.

10. The equipment for storing holographic data according to claim 7, wherein
    the rotating member has a form of at least a part of a circular cone,
    the rotation of the rotating member is transmitted to the recording medium in a state where a side surface of the rotating member is in contact with a side surface of the recording medium, and
    a level of a portion of the rotating member in contact with the side surface of the recording medium is made changeable.

11. The equipment for storing holographic data according to claim 7, wherein
    a cross-section of a side surface of the rotating member has a hyperbolic form,
    the rotation of the rotating member is transmitted to the recording medium in a state where a side surface of the rotating member is in contact with a side surface of the recording medium, and
    a level of a portion of the rotating member in contact with the side surface of the recording medium is made changeable.

12. The equipment for storing holographic data according to claim 5, further comprising an auxiliary member provided coaxially with the medium,
  wherein the intermittent driving unit has a motor whose driving axis rotates intermittently and a rotating member which is connected to the driving axis, and a rotation of the rotating member is transmitted to the recording medium via the auxiliary member.

13. The equipment for storing holographic data according to claim 12, wherein
  the rotating member has a cylindrical form, and
  the rotation of the rotating member is transmitted to the recording medium in a state where a side surface of the rotating member is in contact with a side surface of the auxiliary member.

14. The equipment for storing holographic data according to claim 12, wherein
  the rotating member has a form of at least a part of a circular cone,
  the rotation of the rotating member is transmitted to the recording medium in a state where a side surface of the rotating member is in contact with a side surface of the auxiliary member, and
  a level of a portion of the rotating member in contact with the side surface of the auxiliary member is made changeable.

15. The equipment for storing holographic data according to claim 12, wherein
  a cross-section of a side surface of the rotating member has a hyperbolic form,
  the rotation of the rotating member is transmitted to the recording medium in a state where a side surface of the rotating member is in contact with a side surface of the auxiliary member, and
  a level of a portion of the rotating member in contact with the side surface of the auxiliary member is made changeable.

16. The equipment for storing holographic data according to claim 5, further comprising:
  a position detecting unit which detects the recording position in the recording medium where the recording position is predetermined, wherein
  the control unit makes the recording light irradiation unit perform the recording at the recording position detected by the position detecting unit.

17. The equipment for storing holographic data according to claim 5, further comprising:
  a tracking signal detecting unit which detects a tracking signal from the recording medium where the recording position is predetermined,
  wherein the control unit makes the an intermittent driving unit stop and makes the recording light irradiation unit perform the recording when the tracking signal detecting unit does not detect the tracking signal from the medium.

18. The equipment for storing holographic data according to claim 5, wherein
  the control unit controls the light irradiating unit and the intermittent driving unit so that the recording by the light irradiating unit and the rotation by the intermittent driving unit are executed alternately while setting the positive integer n larger than unity, and
  the control unit controls the intermittent driving unit so that the recording position of the medium is shifted by a distance of Sh thereafter.

19. The equipment for storing holographic data according to claim 18, wherein the control unit controls the light irradiating unit and the intermittent driving unit so that the recording by the light irradiating unit and the rotation by the intermittent driving unit are executed alternately after controlling the intermittent driving unit so that the recording position of the medium is shifted by the distance of Sh.

20. The equipment for storing holographic data according to claim 18, wherein the control unit makes a mechanical coupling between the intermittent driving unit and the recording medium released after making the intermittent driving unit rotate the recording medium, so that the recording position of the medium is shifted by the distance of Sh by inertia.

* * * * *